US012269721B2

(12) United States Patent
Thompson et al.

(10) Patent No.: US 12,269,721 B2
(45) Date of Patent: Apr. 8, 2025

(54) PASSIVELY ACTUATED SENSOR SYSTEM

(71) Applicant: Seegrid Corporation, Pittsburgh, PA (US)

(72) Inventors: Bruce Thompson, Pittsburgh, PA (US); Jacob Seal, Pittsburgh, PA (US); Elijah Richter, Glenshaw, PA (US); Matt Heisel, Pittsburgh, PA (US); Thomas Stimmel, Devon, PA (US); Ben Tylenda, Venetia, PA (US); Pat Braun, Pittsburgh, PA (US)

(73) Assignee: SEEGRID CORPORATION, Pittsburgh, PA (US)

(*) Notice: Subject to any disclaimer, the term of this patent is extended or adjusted under 35 U.S.C. 154(b) by 0 days.

(21) Appl. No.: 18/285,030

(22) PCT Filed: Mar. 28, 2023

(86) PCT No.: PCT/US2023/016617

§ 371 (c)(1),
(2) Date: Sep. 29, 2023

(87) PCT Pub. No.: WO2023/192315

PCT Pub. Date: Oct. 5, 2023

(65) Prior Publication Data

US 2024/0308825 A1 Sep. 19, 2024

Related U.S. Application Data

(60) Provisional application No. 63/324,190, filed on Mar. 28, 2022.

(51) Int. Cl.

| | |
|---|---|
| ***B66F 9/06*** | (2006.01) |
| ***B66F 9/075*** | (2006.01) |
| ***B66F 9/08*** | (2006.01) |
| ***B66F 9/24*** | (2006.01) |

(52) U.S. Cl.

CPC ............ *B66F 9/063* (2013.01); *B66F 9/0755* (2013.01); *B66F 9/08* (2013.01); *B66F 9/24* (2013.01)

(58) Field of Classification Search

None

See application file for complete search history.

(56) References Cited

U.S. PATENT DOCUMENTS

| | | | |
|---|---|---|---|
| 7,320,385 | B2 | 1/2008 | Katae et al. |
| 2004/0098146 | A1 | 5/2004 | Katae et al. |
| 2008/0011554 | A1 | 1/2008 | Broesel et al. |
| 2014/0074341 | A1 | 3/2014 | Weiss |

OTHER PUBLICATIONS

PBC Linear, Cam Roller Technology overview, Aug. 19, 2013, YouTube, https://www.youtube.com/watch?v=ZznFDzjqEi8 (Year: 2013).*

International Search Report and Written Opinion dated Jul. 3, 2023 issued in International Application No. PCT/US2023/016617.

* cited by examiner

*Primary Examiner* — Yufeng Zhang

(74) *Attorney, Agent, or Firm* — Onello & Mello, LLP

(57) ABSTRACT

In accordance with one aspect of the inventive concepts, provided is an autonomous mobile robot (AMR), comprising: a pair of forks coupled to a carriage that is height adjustable within a mast; an object sensor coupled to the carriage and passively movable between a first position above the forks when the forks are lowered and a second position below the forks when the forks are raised, wherein the object sensor is configured to detect objects under the forks when the forks are raised.

18 Claims, 24 Drawing Sheets

PASSIVELY ACTUATED SENSOR SYSTEM

CROSS REFERENCE TO RELATED APPLICATIONS

The present application claims priority to U.S. Provisional Appl. No. 63/324,190 filed on Mar. 28, 2022, entitled PASSIVELY ACTUATED SENSOR DEPLOYMENT, which is incorporated herein by reference in its entirety.

The present application may be related to U.S. Provisional Appl. No. 63/430,184 filed on Dec. 5, 2022, entitled Just in Time Destination Definition and Route Planning; U.S. Provisional Appl. No. 63/430,190 filed on Dec. 5, 2022, entitled Configuring a System that Handles Uncertainty with Human and Logic Collaboration in a Material Flow Automation Solution; U.S. Provisional Appl. No. 63/430,182 filed on Dec. 5, 2022, entitled Composable Patterns of Material Flow Logic for the Automation of Movement; U.S. Provisional Appl. No. 63/430,174 filed on Dec. 5, 2022, entitled Process Centric User Configurable Step Framework for Composing Material Flow Automation; U.S. Provisional Appl. No. 63/430,195 filed on Dec. 5, 2022, entitled Generation of "Plain Language" Descriptions Summary of Automation Logic; U.S. Provisional Appl. No. 63/430,171 filed on Dec. 5, 2022, entitled Hybrid Autonomous System Enabling and Tracking Human Integration into Automated Material Flow; U.S. Provisional Appl. No. 63/430,180 filed on Dec. 5, 2022, entitled A System for Process Flow Templating and Duplication of Tasks Within Material Flow Automation; U.S. Provisional Appl. No. 63/430,200 filed on Dec. 5, 2022, entitled A Method for Abstracting Integrations Between Industrial Controls and Autonomous Mobile Robots (AMRs); and U.S. Provisional Appl. No. 63/430,170 filed on Dec. 5, 2022, entitled Visualization of Physical Space Robot Queuing Areas as Non Work Locations for Robotic Operations, each of which is incorporated herein by reference in its entirety.

The present application may be related to U.S. Provisional Appl. No. 63/348,520 filed on Jun. 3, 2022, entitled System and Method for Generating Complex Runtime Path Networks from Incomplete Demonstration of Trained Activities; U.S. Provisional Appl. No. 63/410,355 filed on Sep. 27, 2022, entitled Dynamic, Deadlock-Free Hierarchical Spatial Mutexes Based on a Graph Network; U.S. Provisional Appl. No. 63/346,483 filed on May 27, 2022, entitled System and Method for Performing Interactions with Physical Objects Based on Fusion of Multiple Sensors; and U.S. Provisional Appl. No. 63/348,542 filed on Jun. 3, 2022, entitled Lane Grid Setup for Autonomous Mobile Robots (AMRs); U.S. Provisional Appl. No. 63/423,679, filed Nov. 8, 2022, entitled System and Method for Definition of a Zone of Dynamic Behavior with a Continuum of Possible Actions and Structural Locations within Same; U.S. Provisional Appl. No. 63/423,683, filed Nov. 8, 2022, entitled System and Method for Optimized Traffic Flow Through Intersections with Conditional Convoying Based on Path Network Analysis; U.S. Provisional Appl. No. 63/423,538, filed Nov. 8, 2022, entitled Method for Calibrating Planar Light-Curtain; each of which is incorporated herein by reference in its entirety.

The present application may be related to US Provisional Appl. 63/324,182 filed on Mar. 28, 2022, entitled A Hybrid, Context-Aware Localization System For Ground Vehicles; U.S. Provisional Appl. No. 63/324,184 filed on Mar. 28, 2022, entitled Safety Field Switching Based On End Effector Conditions; US Provisional Appl. 63/324,185 filed on Mar. 28, 2022, entitled Dense Data Registration From a Vehicle Mounted Sensor Via Existing Actuator; U.S. Provisional Appl. No. 63/324,187 filed on Mar. 28, 2022, entitled Extrinsic Calibration Of A Vehicle-Mounted Sensor Using Natural Vehicle Features; U.S. Provisional Appl. No. 63/324,188 filed on Mar. 28, 2022, entitled Continuous And Discrete Estimation Of Payload Engagement Disengagement Sensing; U.S. Provisional Appl. No. 63/324,192 filed on Mar. 28, 2022, entitled Automated Identification Of Potential Obstructions In A Targeted Drop Zone; US Provisional Appl. 63/324,193 filed on Mar. 28, 2022, entitled Localization Of Horizontal Infrastructure Using Point Clouds; US Provisional Appl. 63/324,195 filed on Mar. 28, 2022, entitled Navigation Through Fusion of Multiple Localization Mechanisms and Fluid Transition Between Multiple Navigation Methods; US Provisional Appl. 63/324,198 filed on Mar. 28, 2022, entitled Segmentation Of Detected Objects Into Obstructions And Allowed Objects; US Provisional Appl. 62/324,199 filed on Mar. 28, 2022, entitled Validating The Pose Of An AMR That Allows It To Interact With An Object; and U.S. Provisional Appl. No. 63/324,201 filed on Mar. 28, 2022, entitled A System For AMRs That Leverages Priors When Localizing Industrial Infrastructure; each of which is incorporated herein by reference in its entirety.

The present application may be related to U.S. patent application Ser. No. 11/350,195, filed on Feb. 8, 2006, U.S. Pat. No. 7,446,766, Issued on Nov. 4, 2008, entitled Multidimensional Evidence Grids and System and Methods for Applying Same; U.S. patent application Ser. No. 12/263,983 filed on Nov. 3, 2008, U.S. Pat. No. 8,427,472, Issued on Apr. 23, 2013, entitled Multidimensional Evidence Grids and System and Methods for Applying Same; U.S. patent application Ser. No. 11/760,859, filed on Jun. 11, 2007, U.S. Pat. No. 7,880,637, Issued on Feb. 1, 2011, entitled Low-Profile Signal Device and Method For Providing Color-Coded Signals; U.S. patent application Ser. No. 12/361,300 filed on Jan. 28, 2009, U.S. Pat. No. 8,892,256, Issued on Nov. 18, 2014, entitled Methods For Real-Time and Near-Real Time Interactions With Robots That Service A Facility; U.S. patent application Ser. No. 12/361,441, filed on Jan. 28, 2009, U.S. Pat. No. 8,838,268, Issued on Sep. 16, 2014, entitled Service Robot And Method Of Operating Same; U.S. patent application Ser. No. 14/487,860, filed on Sep. 16, 2014, U.S. Pat. No. 9,603,499, Issued on Mar. 28, 2017, entitled Service Robot And Method Of Operating Same; U.S. patent application Ser. No. 12/361,379, filed on Jan. 28, 2009, U.S. Pat. No. 8,433,442, Issued on Apr. 30, 2013, entitled Methods For Repurposing Temporal-Spatial Information Collected By Service Robots; U.S. patent application Ser. No. 12/371,281, filed on Feb. 13, 2009, U.S. Pat. No. 8,755,936, Issued on Jun. 17, 2014, entitled Distributed Multi-Robot System; U.S. patent application Ser. No. 12/542,279, filed on Aug. 17, 2009, U.S. Pat. No. 8,169,596, Issued on May 1, 2012, entitled System And Method Using A Multi-Plane Curtain; U.S. patent application Ser. No. 13/460,096, filed on Apr. 30, 2012, U.S. Pat. No. 9,310,608, Issued on Apr. 12, 2016, entitled System And Method Using A Multi-Plane Curtain; U.S. patent application Ser. No. 15/096,748, filed on Apr. 12, 2016, U.S. Pat. No. 9,910,137, Issued on Mar. 6, 2018, entitled System and Method Using A Multi-Plane Curtain; U.S. patent application Ser. No. 13/530,876, filed on Jun. 22, 2012, U.S. Pat. No. 8,892,241, Issued on Nov. 18, 2014, entitled Robot-Enabled Case Picking; U.S. patent application Ser. No. 14/543,241, filed on Nov. 17, 2014, U.S. Pat. No. 9,592,961, Issued on Mar. 14, 2017, entitled Robot-Enabled Case Picking; U.S. patent application Ser. No. 13/168,639, filed on Jun. 24, 2011, U.S.

Pat. No. 8,864,164, Issued on Oct. 21, 2014, entitled Tugger Attachment; US Design patent application Ser. No. 29/398,127, filed on Jul. 26, 2011, U.S. Patent Number D680,142, Issued on Apr. 16, 2013, entitled Multi-Camera Head; US Design patent application Ser. No. 29/471,328, filed on Oct. 30, 2013, U.S. Pat. No. D730,847, Issued on Jun. 2, 2015, entitled Vehicle Interface Module; U.S. patent application Ser. No. 14/196,147, filed on Mar. 4, 2014, U.S. Pat. No. 9,965,856, Issued on May 8, 2018, entitled Ranging Cameras Using A Common Substrate; U.S. patent application Ser. No. 16/103,389, filed on Aug. 14, 2018, U.S. Pat. No. 11,292,498, Issued on Apr. 5, 2022, entitled Laterally Operating Payload Handling Device; U.S. patent application Ser. No. 16/892,549, filed on Jun. 4, 2020, US Publication Number 2020/0387154, Published on Dec. 10, 2020, entitled Dynamic Allocation And Coordination of Auto-Navigating Vehicles and Selectors; U.S. patent application Ser. No. 17/163,973, filed on Feb. 1, 2021, US Publication Number 2021/0237596, Published on Aug. 5, 2021, entitled Vehicle Auto-Charging System and Method; U.S. patent application Ser. No. 17/197,516, filed on Mar. 10, 2021, US Publication Number 2021/0284198, Published on Sep. 16, 2021, entitled Self-Driving Vehicle Path Adaptation System and Method; U.S. patent application Ser. No. 17/490,345, filed on Sep. 30, 2021, US Publication Number 2022-0100195, published on Mar. 31, 2022, entitled Vehicle Object-Engagement Scanning System And Method; U.S. patent application Ser. No. 17/478,338, filed on Sep. 17, 2021, US Publication Number 2022-0088980, published on Mar. 24, 2022, entitled Mechanically-Adaptable Hitch Guide each of which is incorporated herein by reference in its entirety.

FIELD OF INTEREST

The present inventive concepts relate to the field of systems and methods in the field of autonomous and/or robotic vehicles. Aspects of the inventive concepts are applicable to any mobile robotics application involving manipulation. More specifically, the present inventive concepts relate to systems and methods of passively actuated sensor deployment in an autonomous mobile robot (AMR).

BACKGROUND

In autonomous mobile robots (AMRs), there is a need to be able to scan under the forks to detect objects during the pick and place sequences. It is important for AMRs to have awareness of the environment during travel and payload operations. Sensors may be obstructed by the AMR and/or payload and may be damaged by the forks when the forks are lowered to the floor.

SUMMARY OF THE INVENTION

There is a need to be able to scan under the forks to detect objects during the pick and place sequences. In various embodiments, to the sensor can be located so that in can detect objects below the forks and not be obstructed by the truck and/or payload. In various embodiments, the sensor is located below the forks. In various embodiments, the sensor is configured to retract back into the mast when the forks are lowered to protect the sensor when the forks are lowered to the floor. While an active deployment of the sensor is possible, a passive mechanism for deploying the sensor could be more cost effective and provide less complexity. In various embodiments, the sensor can take the form of one or more scanners.

In accordance with one aspect of the inventive concepts, provided is an autonomous mobile robot (AMR), comprising: a pair of forks coupled to a carriage that is height adjustable within a mast; an object sensor coupled to the carriage and passively movable between a first position above the forks when the forks are lowered and a second position below the forks when the forks are raised, wherein the object sensor is configured to detect objects under the forks when the forks are raised.

In various embodiments, the robot further comprises a deployment hard stop defining an upper limit of movement of the carriage relative to the mast and a retracting hard stop defining a lower limit of movement of the carriage relative to the mast.

In various embodiments, the robot further comprises a position feedback sensor configured to determine when the carriage is at its upper limit of movement when the feedback sensor engages the deployment hard stop, wherein the sensor is deployed when the position feedback sensor determines that the carriage is at its upper limit of movement.

In various embodiments, the position feedback sensor is configured to determine when the carriage is at its lower limit of movement when the feedback sensor engages the retracting hard stop, wherein the sensor is retracted into the mast when the position feedback sensor determines that the carriage is at its lower limit of movement.

In various embodiments, the object sensor is coupled to the carriage by a slide having a defined range of movement relative to the carriage.

In various embodiments, the slide is at a top of its range of motion relative to the carriage when the carriage is in contact with the retracting hard stop.

In various embodiments, the slide is at a bottom of its range of motion relative to the carriage when the carriage is in contact with the deployment hard stop.

In various embodiments, the robot further comprises a magnet at the deployment hard stop configured to prevent or dampen movement of the object sensor during robot and/or fork operation.

In various embodiments, the object sensor is or include a LiDAR scanner and/or camera.

In various embodiments, when the object sensor is in the first position, the object sensor is retracted in the mast.

In various embodiments, the pair of forks comprises a protection plate configured to protect the object sensor when the pair of forks are lowered.

In various embodiments, the robot further comprises a sensor bracket, the object sensor being positioned on the sensor bracket.

In various embodiments, the sensor bracket comprises a flange configured to engage a retracting hard stop defining a lower limit of movement of the carriage relative to the mast.

In various embodiments, the robot further comprises first and second cam roller slides extending along the height of the robot and at least one cam roller positioned in the cam roller slides, wherein the cam rollers being coupled to the sensor bracket.

In various embodiments, the robot further comprises a deployment hard stop defining an upper limit of movement of the carriage relative to the mast; a retracting hard stop defining a lower limit of movement of the carriage relative to the mast; a position feedback sensor configured to determine when the carriage is at its upper limit of movement when the feedback sensor engages the deployment hard stop; a slide coupled to the carriage having a defined range of movement relative to the carriage; a sensor bracket, wherein the object sensor being positioned on the sensor bracket.

In various embodiments, the robot further comprises a sensor mount configured to couple the sensor bracket to the slide.

In various embodiments, the robot further comprises first and second cam roller slides extending along the height of the robot and at least one cam roller positioned in the cam roller slides, wherein the cam rollers being coupled to the sensor bracket.

In accordance with one aspect of the inventive concepts, provided is a passively actuated sensor kit for use with a robotic vehicle having a pair of forks coupled to a carriage that is height adjustable within a mast, the kit comprising: an object sensor configured to couple to the carriage and passively move between a first position above the forks when the forks are lowered and a second position below the forks when the forks are raised, wherein the object sensor is configured to detect objects under the forks when the forks are raised; a deployment hard stop defining an upper limit of movement of the carriage relative to the mast and a retracting hard stop defining a lower limit of movement of the carriage relative to the mast; and a position feedback sensor configured to determine when the carriage is at an upper limit of movement when the feedback sensor engages the deployment hard stop, wherein the sensor is deployed when the position feedback sensor determines that the carriage is at its upper limit of movement.

In various embodiments, the kit further comprises a slide, wherein the object sensor is couplable to the carriage by the slide to have a defined range of movement relative to the carriage.

In various embodiments, the slide is at a top of its range of motion relative to the carriage when the carriage is in contact with the retracting hard stop.

In various embodiments, the slide is at a bottom of its range of motion relative to the carriage when the carriage is in contact with the deployment hard stop.

In various embodiments, the kit further comprises a magnet at the deployment hard stop configured to prevent or dampen movement of the object sensor during robot and/or fork operation.

In various embodiments, the object sensor is or includes a LiDAR scanner and/or camera.

In various embodiments, when the object sensor is in the first position, the object sensor is configured to retract into the mast.

In various embodiments, the kit further comprises a protection plate configured to couple to the pair of forks to protect the object sensor when the pair of forks is lowered.

In various embodiments, the kit further comprises a sensor bracket, the object sensor being positioned on the sensor bracket.

In various embodiments, the sensor bracket comprises a flange configured to engage a retracting hard stop defining a lower limit of movement of the carriage relative to the mast.

In various embodiments, the kit further comprises first and second cam roller slides extending along the height of the robot and at least one cam roller positioned in the cam roller slides, wherein the cam rollers being coupled to the sensor bracket.

In accordance with one aspect of the inventive concepts, provided is a robotic vehicle having a pair of forks coupled to a carriage that is height adjustable within a mast and including a passively actuated sensor system, comprising: n object sensor configured to couple to the carriage and passively move between a first position above the forks when the forks are lowered and a second position below the forks when the forks are raised, wherein the object sensor is configured to detect objects under the forks when the forks are raised; a deployment hard stop defining an upper limit of movement of the carriage relative to the mast; a retracting hard stop defining a lower limit of movement of the carriage relative to the mast; a position feedback sensor configured to determine when the carriage is at its upper limit of movement when the feedback sensor engages the deployment hard stop; a slide coupled to the carriage having a defined range of movement relative to the carriage; and a sensor bracket coupled to the slide, wherein the object sensor is coupled to the sensor bracket.

In various embodiments, the robot further comprises a sensor mount configured to couple the sensor bracket to the slide.

In various embodiments, the robot further comprises first and second cam roller slides extending along the height of the robot and at least one cam roller positioned in the cam roller slides, wherein the cam rollers being coupled to the sensor bracket.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. In the drawings.

DESCRIPTION OF PREFERRED EMBODIMENT

Figure 1:
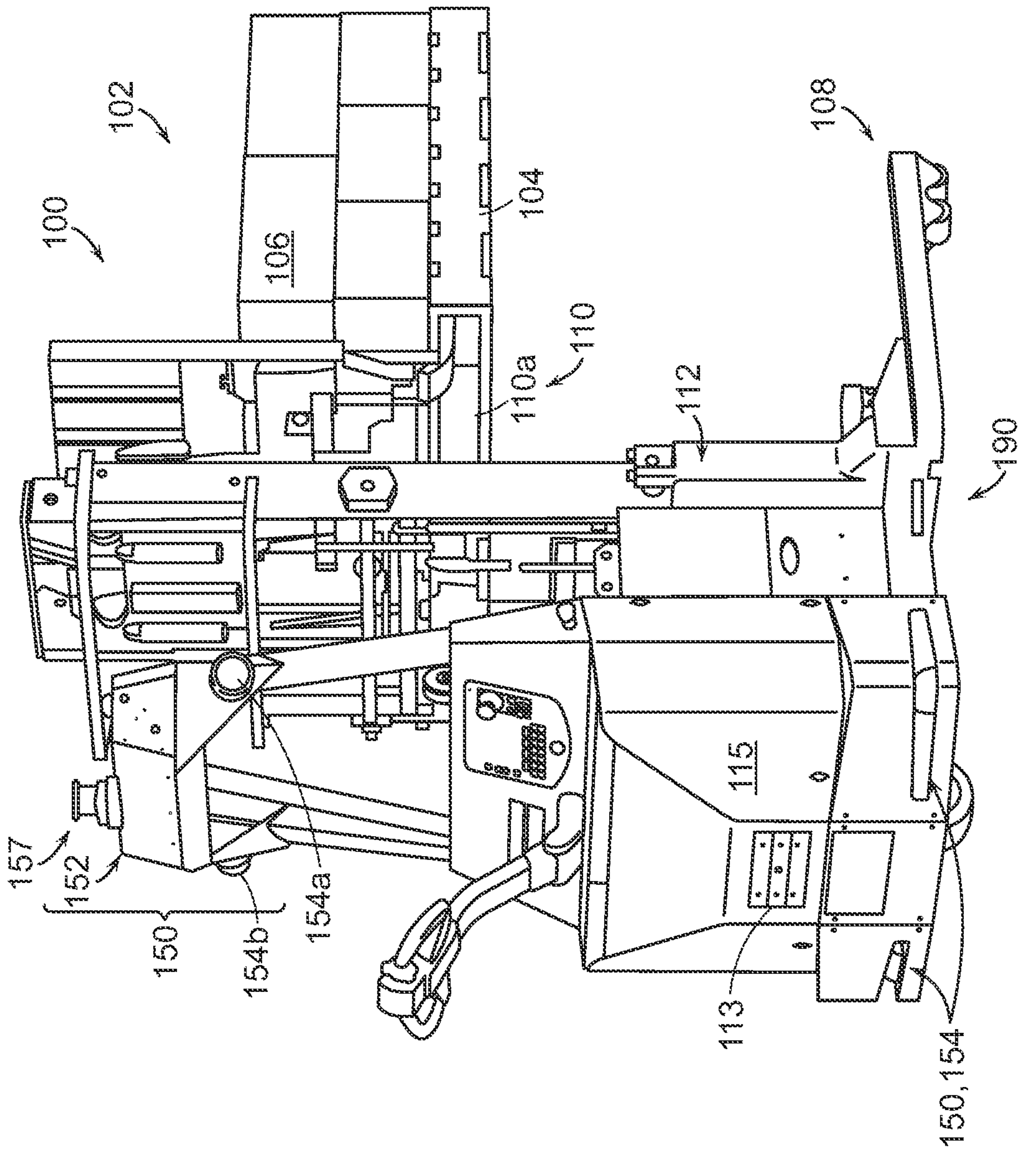
FIG. 1 is a perspective view of an embodiment of an AMR having a passively actuated sensor, in accordance with aspects of the inventive concepts.

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements may be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

In the context of the inventive concepts, and unless otherwise explicitly indicated, a "real-time" action is one that occurs while the AMR is in-service and performing normal operations. This is typically in immediate response to new sensor data or triggered by some other event. The output of an operation performed in real-time will take effect upon the system so as to minimize any latency.

According to the present inventive concepts, a robotic vehicle includes a passively actuated sensor system. In some embodiments, the passively actuated sensor system includes a sensor or scanner located below the forks of the mobile robot in order to detect objects and not be obstructed by the truck and/or payload. The sensor is retractable back into the mast when the forks are lowered in order to protect the sensor when the forks are lowered to the floor. The system passively deploys/retracts a sensor when a certain fork height is achieved. A passive mechanism for deploying the sensor saves money and reduces complexity. The passively actuated sensor system may be implemented with any automated lift system requiring sensing toward the forks/payload. The passively actuated sensor system can be in communication with a drive and/or navigation system of the robotic vehicle. The passively actuated sensor system can also be in communication with a load engagement system that controls the raising and lowering of the forks, e.g., top stop or suspend operation of the forks in response to detection of an object.

In some embodiments, the passively actuated sensor system can take the form of a kit configured as an optional augmentation to a mobile robot, e.g., AMR. In some embodiments, the system can take the form of a robot vehicle including a passively actuated sensor system.

In various embodiments, the sensor can be or include a camera, a stereo camera, and/or a laser range scanner, such as a LiDAR sensor (Light Detection and Ranging sensor). The sensor can be a 2D sensor or a 3D sensor, or a combination thereof.

Figure 2:
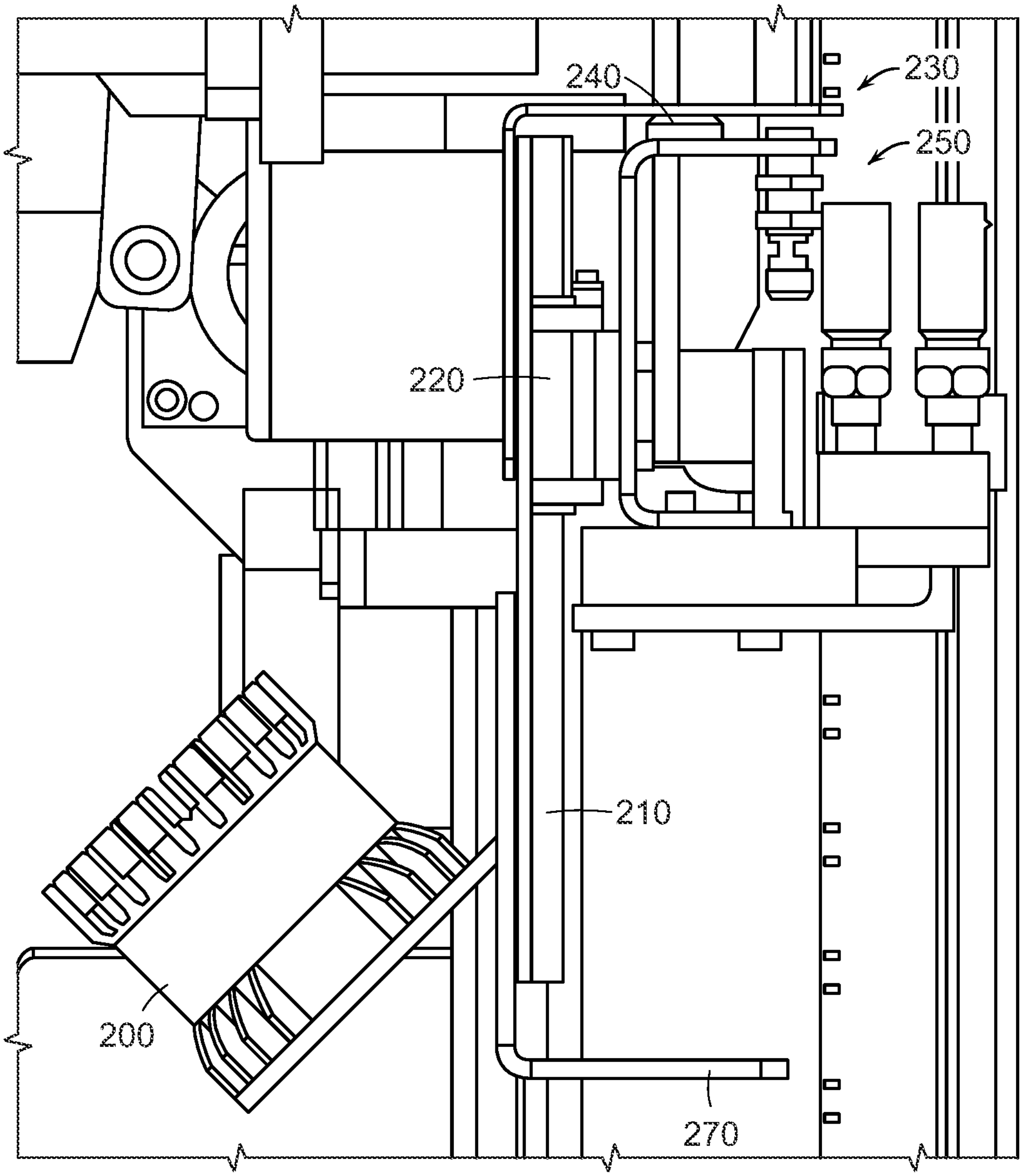
FIG. 2 is a close-up view of an embodiment of a sensor of an AMR deployed with forks partially raised, in accordance with aspects of the inventive concepts.
Figure 3:
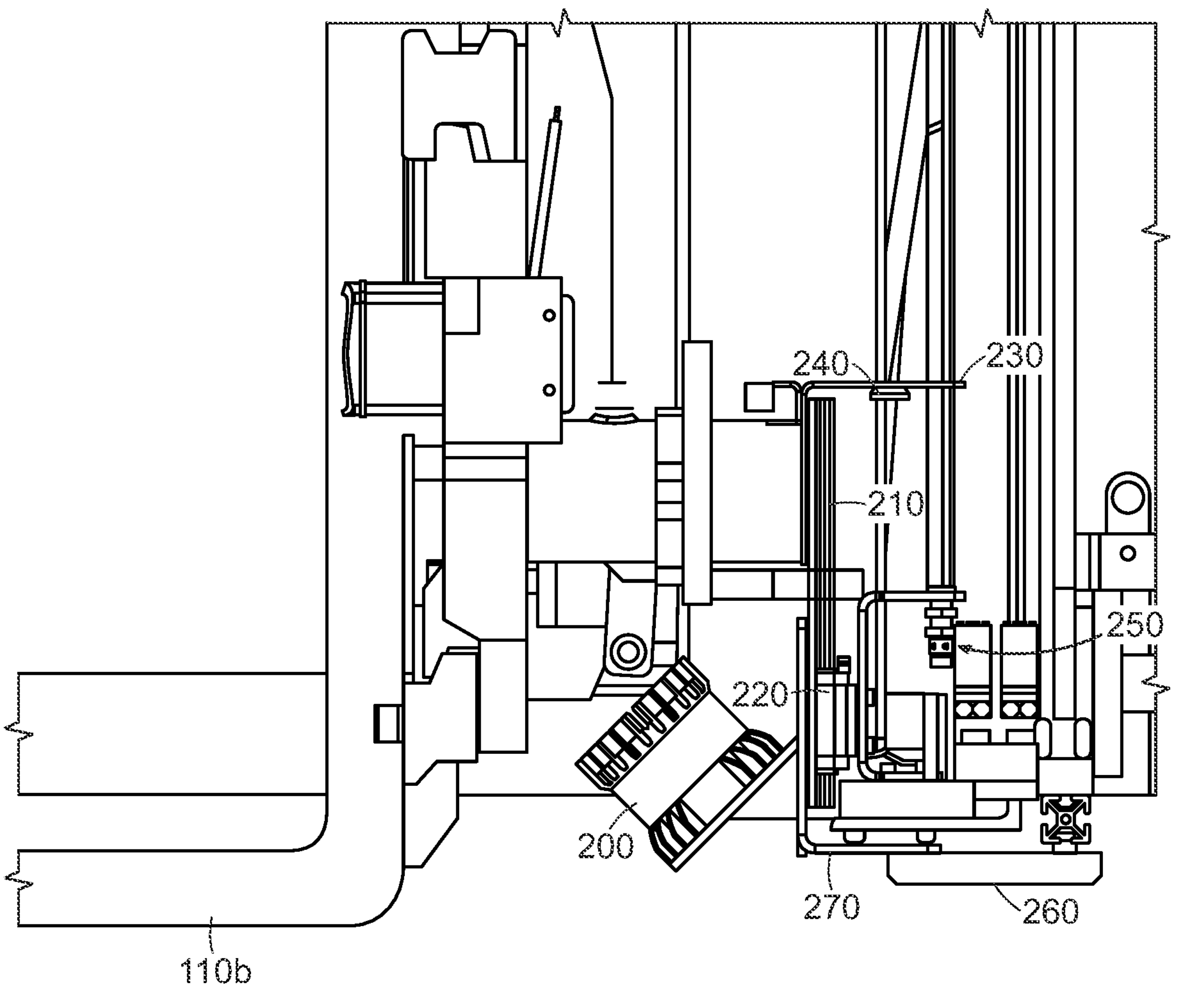
FIG. 3 is a close-up view of an embodiment of a sensor of an AMR stowed with forks fully lowered, in accordance with aspects of the inventive concepts.
Figure 4:
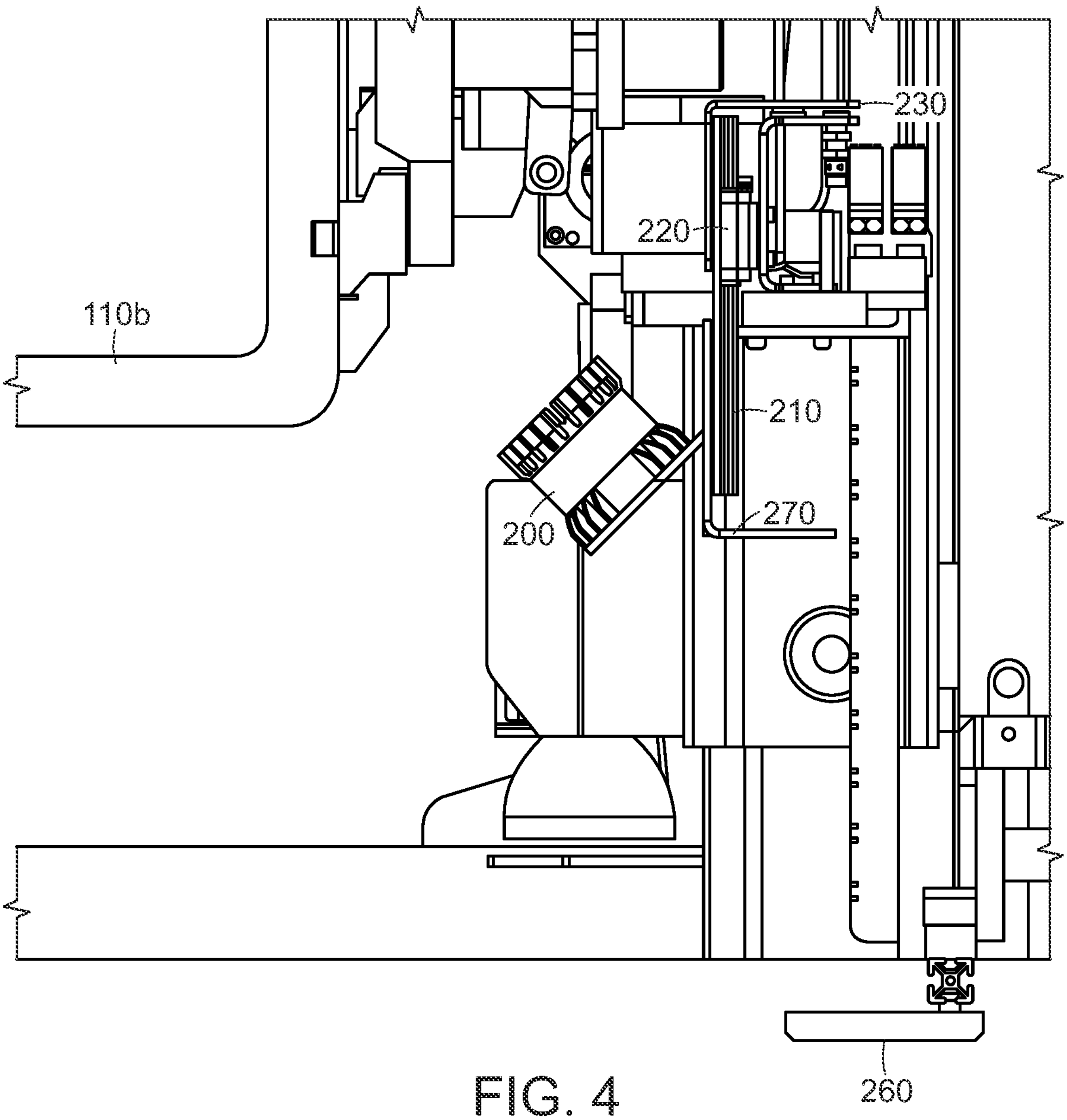
FIG. 4 is a close-up view of an embodiment of a sensor of an AMR deployed with forks raised to payload carry height, in accordance with aspects of the inventive concepts.

FIG. 1 is a perspective view of an embodiment of robotic vehicle in the form of an AMR 100 having a passively actuated sensor 200, in accordance with aspects of the inventive concepts. FIG. 2 is a close-up view of an embodiment of the sensor 200 of the AMR 100 deployed with forks 110*a,b* partially raised, in accordance with aspects of the inventive concepts. FIG. 3 is a close-up view of an embodiment of the sensor 200 of the AMR 100 stowed with forks 110*a,b* fully lowered, in accordance with aspects of the inventive concepts. FIG. 4 is a close-up view of an embodiment of the sensor 200 of the AMR 100 deployed with forks 110*a,b* raised to payload carry height, in accordance with aspects of the inventive concepts.

In this embodiment, the AMR 100 includes a payload area 102 configured to transport a pallet 104 loaded with goods 106. The AMR 100 can comprise a battery area 112 for holding one or more batteries. In various embodiments, the one or more batteries can be configured for charging via a charging interface 113. The AMR 100 can also include a main housing 115 within which various control elements and subsystems can be disposed, including those that enable the AMR to navigate from place to place.

The AMR 100 may include a plurality of sensors 150 that provide various forms of sensor data that enable the AMR to safely navigate throughout an environment, engage with objects to be transported, and avoid obstructions. In various embodiments, the sensor data from one or more of the sensors 150 can be used for navigation, including avoidance of detected objects, obstructions, hazards, humans, other robotic vehicles, and/or congestion during navigation. The sensors 150 can include one or more cameras, stereo cameras 152, radars, and/or laser imaging, detection, and ranging (LiDAR) scanners 154. One or more of the sensors 150 can form part of a 2D or 3D high-resolution imaging system.

In some embodiments, such as the one shown in FIG. 1, the AMR 100 comprises a load engagement portion 110, such as a pair of forks 110*a*, 110*b*. The forks 110*a,b* extend from the AMR in a first direction. As seen in FIG. 1, the forks 110*a* and 110*b* are configured to engage, carry, lift, lower, and extend through the pallet 114 carrying the payload 106.

As seen in FIGS. 2-4, embodiments of the passively actuated sensor system, which include an actuation slide 210 and carriage 220, the sensor 200, a deployment hard stop 230, a magnet 240 on the deployment hard stop 230, a retracting hard stop 260, and an actuation position feedback sensor 250. In this embodiment, the sensor is coupled to a sensor mount 270. The sensor mount 270 is coupled to the slide 210 by, for example, bolts.

When retracted, the sensor 200 rests inside the mast above the forks 110*a,b*, as seen in FIG. 3. When the forks 110*a,b* are lifted, the sensor 200 remains stationary while the mast actuation slide 210 moves until the deployment hard stop 230 is engaged. A position feedback sensor 250 confirms that the sensor 200 is fully deployed at a repeatable location relative to the forks 110*a,b*. A magnet 240 is used on the deployment hard stop 230 to prevent the sensor 200 from bouncing up and down during operation. The sensor 200 will move upward and downward with the forks 110*a,b* as long as the sensor 200 does not make contact with the retracting hard stop 260. The sensor 200 is deployed far enough below the forks 110*a,b* that it is not obstructed by truck 100, forks 110*a,b* or payload 106 and provides an unobstructed view under, behind and below the raised forks 110*a,b*.

To retract the sensor 200, the forks 110*a,b* are lowered until the sensor 200 makes contact with the retracting hard stop 260. The forks 110*a,b* will continue to move downward causing the deployment hard stop 230 to no longer make contact and the position feedback sensor 250 will no longer be active. The forks 110*a,b* can be lowered to the ground while the sensor 200 remains stationary inside the mast.

The sensor 200 provides data to improve the robotic vehicle's 100 awareness of the environment during travel and payload operations. According to various embodiments, the passively actuated sensor system provides a view behind the forks 110*a,b* when the truck 100 is traveling in a forks-forward direction in order to detect potential obstacles when the forks 110*a,b* are at payload carry height. According to various embodiments, the system allows the sensor 200 to scan for the front of a shelf/table (also known as apron detection) to allow the robot 100 to closely approach a payload pickup/drop location and getting the outriggers very close to the table structure for load transactions. According to various embodiments, the system allows the sensor 200 to scan for the surface of a shelf/table (also known as free space checking) to assure the area is free of obstacles or other payloads in placement and determine the best location to place the payload.

According to various embodiments, the sensor 200 is retracted into the mast of the AMR 100 when the forks 110*a,b* are lowered to the floor. The sensor 200 remains in the retracted position until the forks 110*a,b* have reached a predetermined height, which is sensed by the position feedback sensor 250, and the deployment hard stop 230 is engaged. The hard stop 230 defines a physical termination to the path of the carriage 220. At which point, the sensor 200 moves upward and downward with the forks 110*a,b* until the sensor 200 makes contact with the retracting hard stop 260. When the sensor 200 makes contact with the retracting hard stop 260, the sensor 200 is retracted into the mast of the AMR 100.

Figure 5:
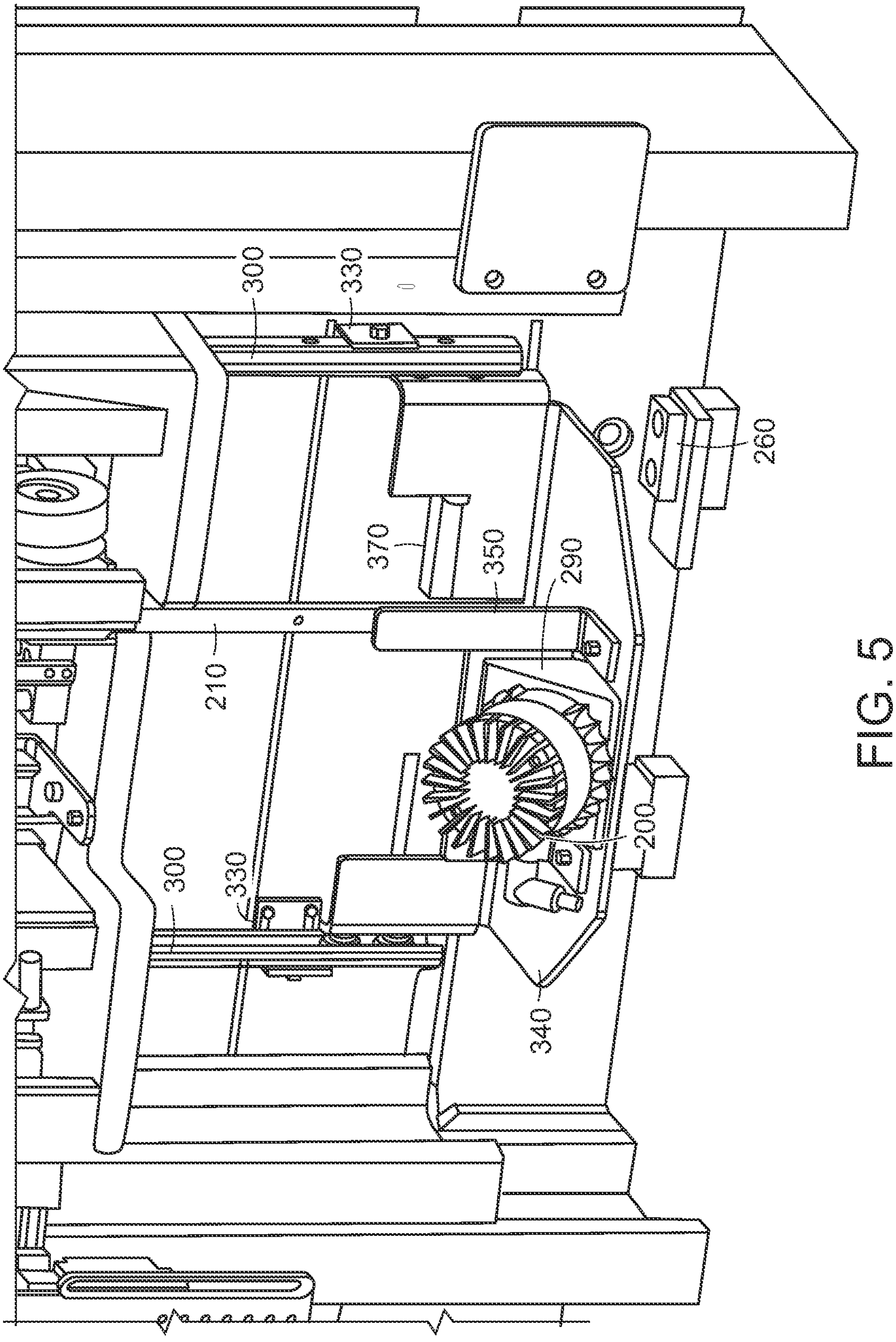
FIG. 5 is a close-up view of an alternative embodiment of a sensor of an AMR, in accordance with aspects of the inventive concepts.

FIG. 5 contains another embodiment of an AMR having a passively actuated sensor, in accordance with aspects of the inventive concepts.

Figure 6A:
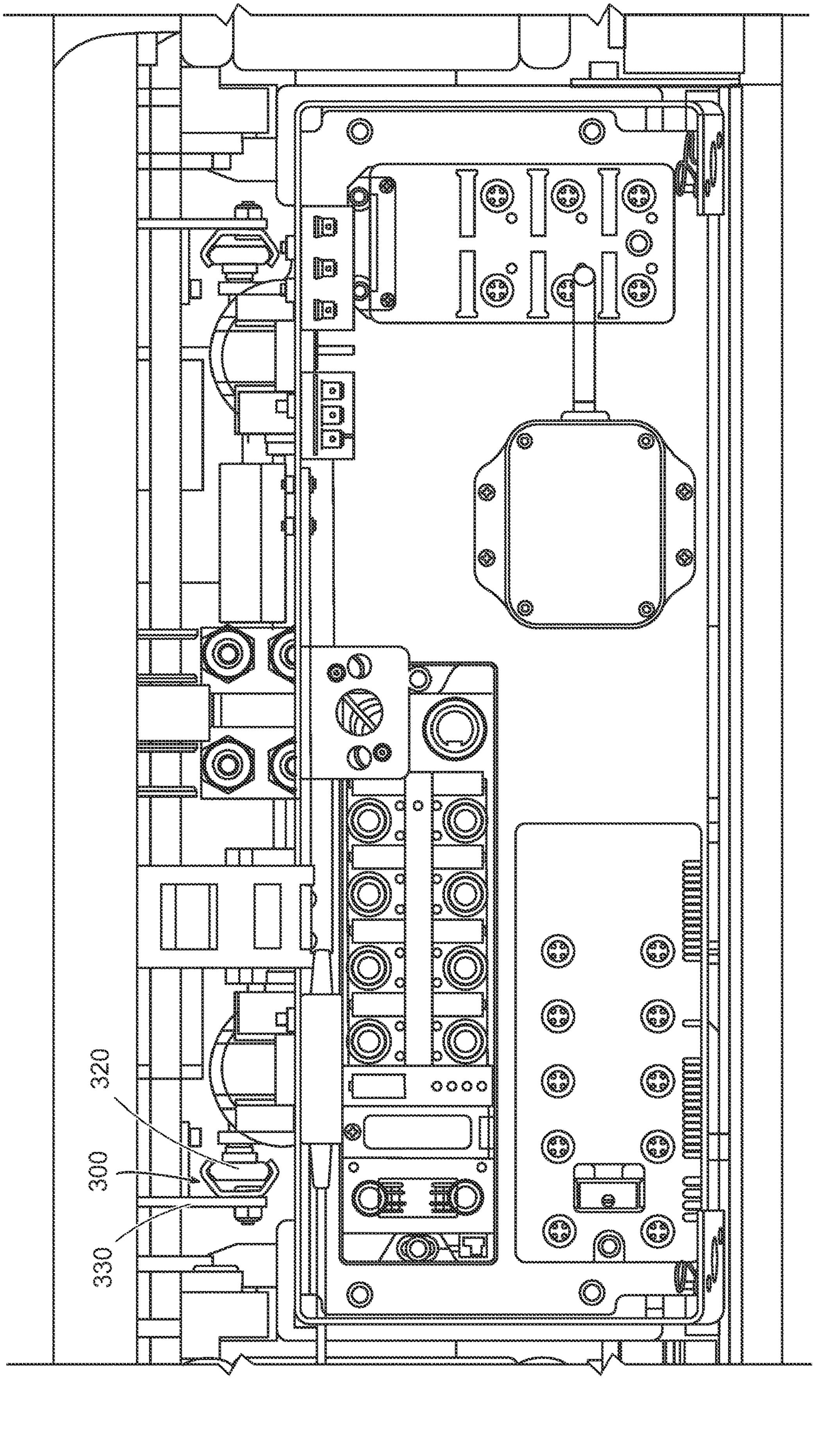
FIG. 6A is a perspective view of the embodiment of FIG. 5, in accordance with aspects of the inventive concepts.
Figure 6B:
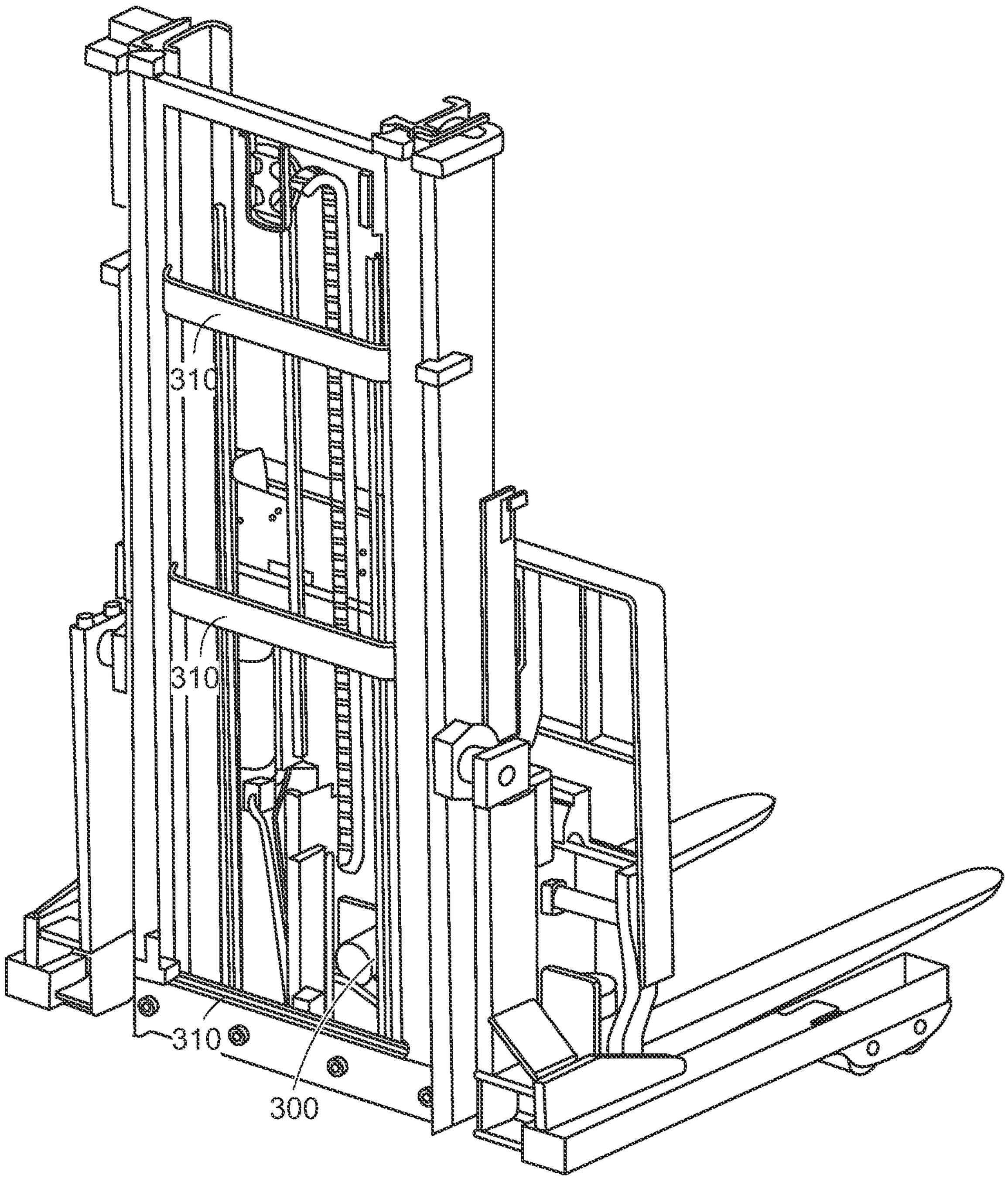
FIG. 6B is a perspective view of the embodiment of FIG. 5, in accordance with aspects of the inventive concepts.

FIG. 5 is a close-up view of an alternative embodiment of a sensor 200 of an AMR 100, in accordance with aspects of the inventive concepts. FIG. 6A is a top view of the embodiment of FIG. 5, in accordance with aspects of the inventive concepts. FIG. 6B is a perspective view of the embodiment of FIG. 5, in accordance with aspects of the inventive concepts.

FIG. 5 contains the same elements are FIGS. 2-4 and further includes two cam roller slides 300 that run along the height of the AMR 100 for improved stability of the sensor 200.

Figure 7:
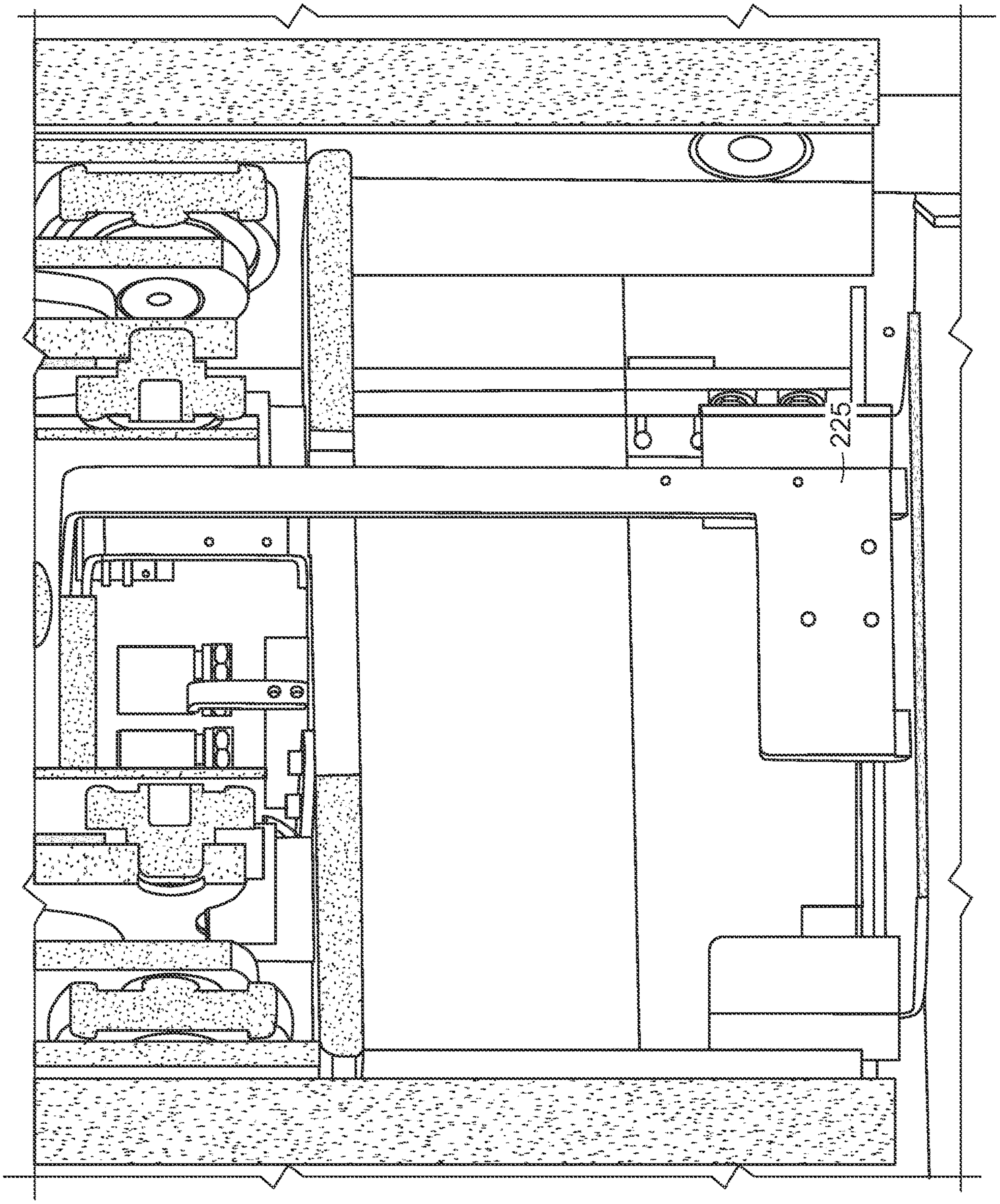
FIG. 7 is a close-up view of an alternative embodiment of a sensor of an AMR, in accordance with aspects of the inventive concepts.

FIG. 7 is a close-up view of an alternative embodiment of a sensor 200 of an AMR 100, in accordance with aspects of the inventive concepts. The embodiment of FIG. 7 includes the roller slides 300 as in FIG. 5, however, the slide 210 and carriage 220 of FIG. 5 are removed and replaced with a tab/flag 225 for the magnet 240 and position feedback sensor 250.

Each cam roller slide 300 includes three adjustable attachment points 310, as seen in FIG. 6B, in order to prevent binding. Two cam rollers 320 are positioned in each of the cam roller slides 300.

The sensor 200 is positioned on a sensor block 290. The sensor block 290 is mounted on a sensor bracket 340. The cam rollers 320 are coupled to the sensor bracket 340.

The sensor block 290 is coupled to a sensor mount 350 which is coupled to the slide 210 in FIG. 5 and the tab/flag 225 in FIG. 7. Countersunk bolts 355 couple the sensor mount 350 to the sensor bracket 340. The sensor block 290 is coupled to the sensor mount 350, for example, using three bolts 360 on the back of the sensor mount 350.

The cam roller slides 300 are coupled to the AMR 100 by brackets 330.

Figure 10A:
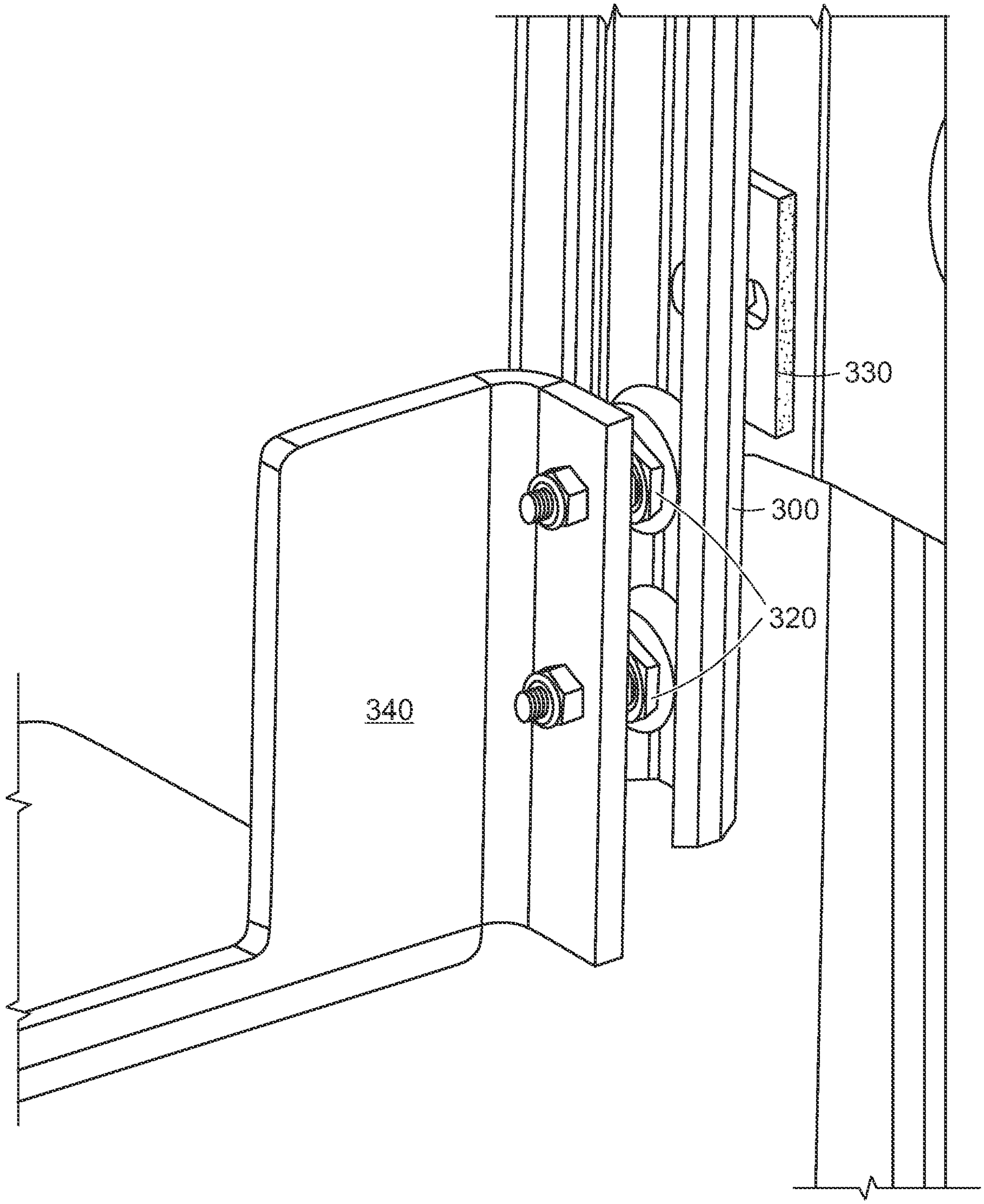
FIGS. 10A-C are close-up views of cam rollers of FIGS. 5 and 7, in accordance with aspects of the inventive concepts.
Figure 10B:
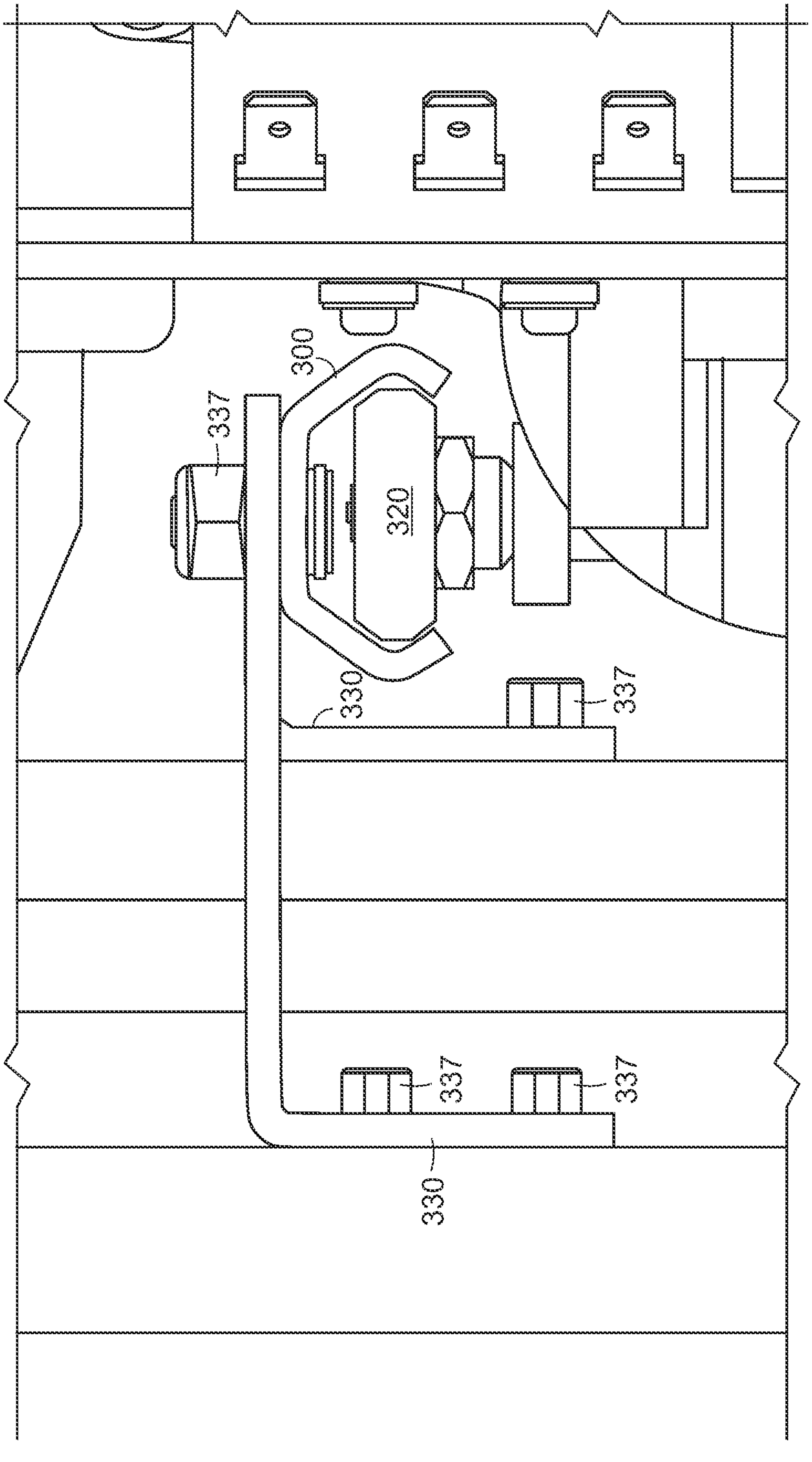
Figure 10C:
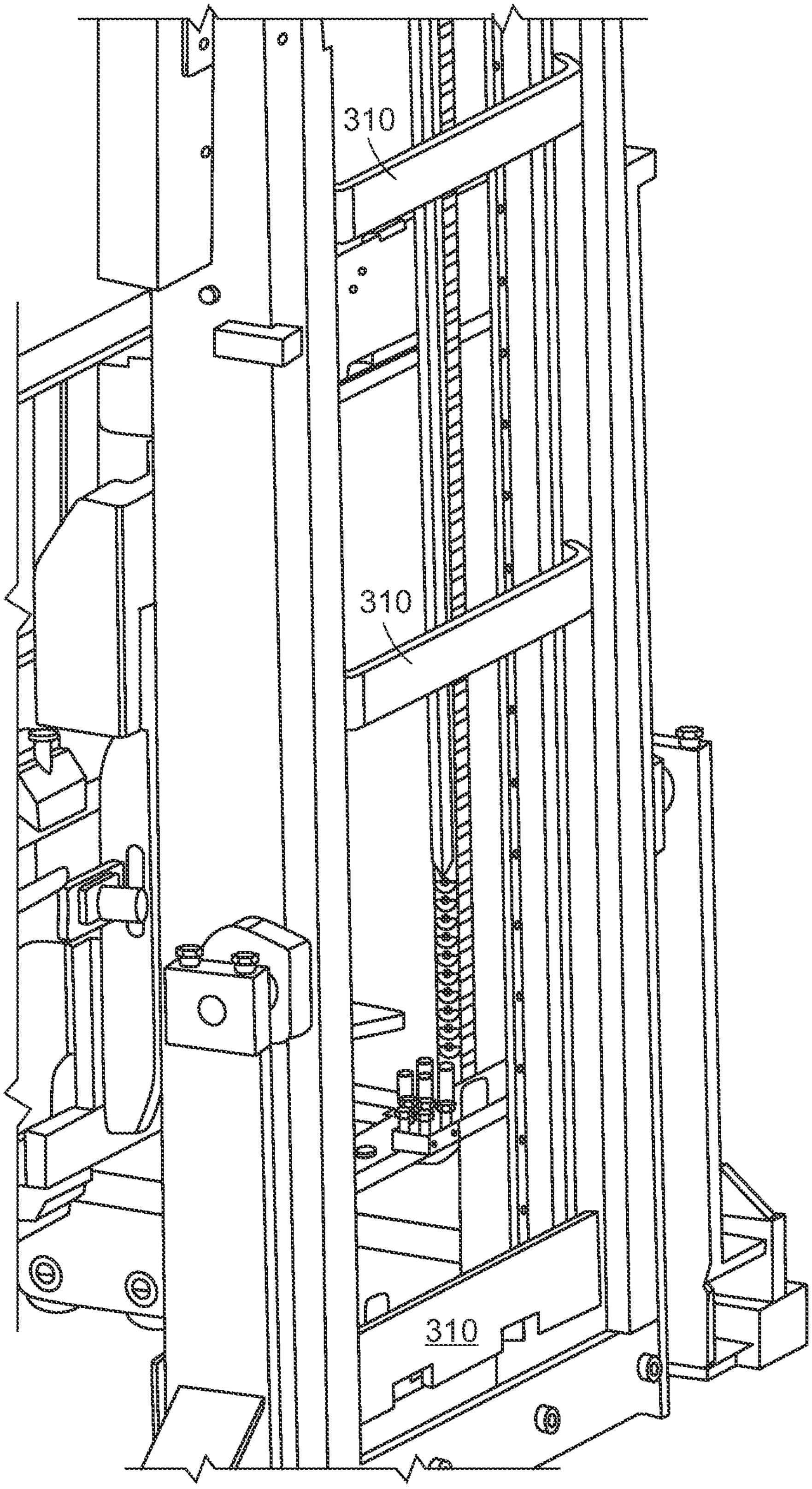

FIGS. 10A-C are close-up views of cam rollers 320 and cam roller slides 300 of FIGS. 5 and 7, in accordance with aspects of the inventive concepts.

Figure 10D:
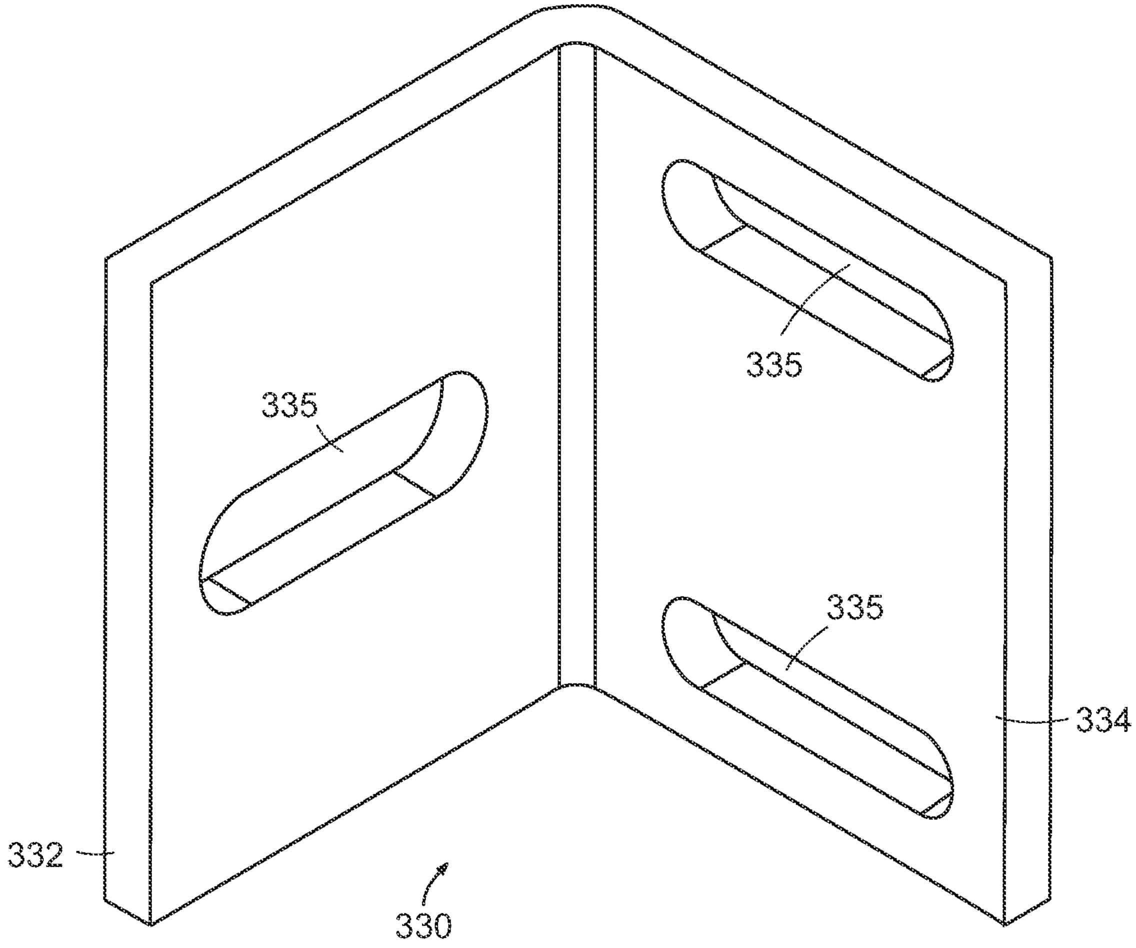
FIG. 10D is a perspective view of a cam roller bracket of FIGS. 10A-10C, in accordance with aspects of the inventive concepts.

FIG. 10D is a perspective view of a cam roller bracket 330 of FIGS. 10A-10C, in accordance with aspects of the inventive concepts.

The brackets 330 are slotted to prevent binding, as seen in FIG. 10D. As seen in FIG. 10D, a first side 332 of bracket 330 is configured to be coupled to the cam roller slide 300 and a second side 334 of bracket 330 is configured to be coupled to the AMR 100. Bolts 337 extend through openings 335 of the bracket 330. A flange 370 on the back of the sensor bracket 340 catches the hard stop 230.

As seen in FIG. 10B, two different slotted attachment brackets 330 are used due to differences in length.

Figure 8A:
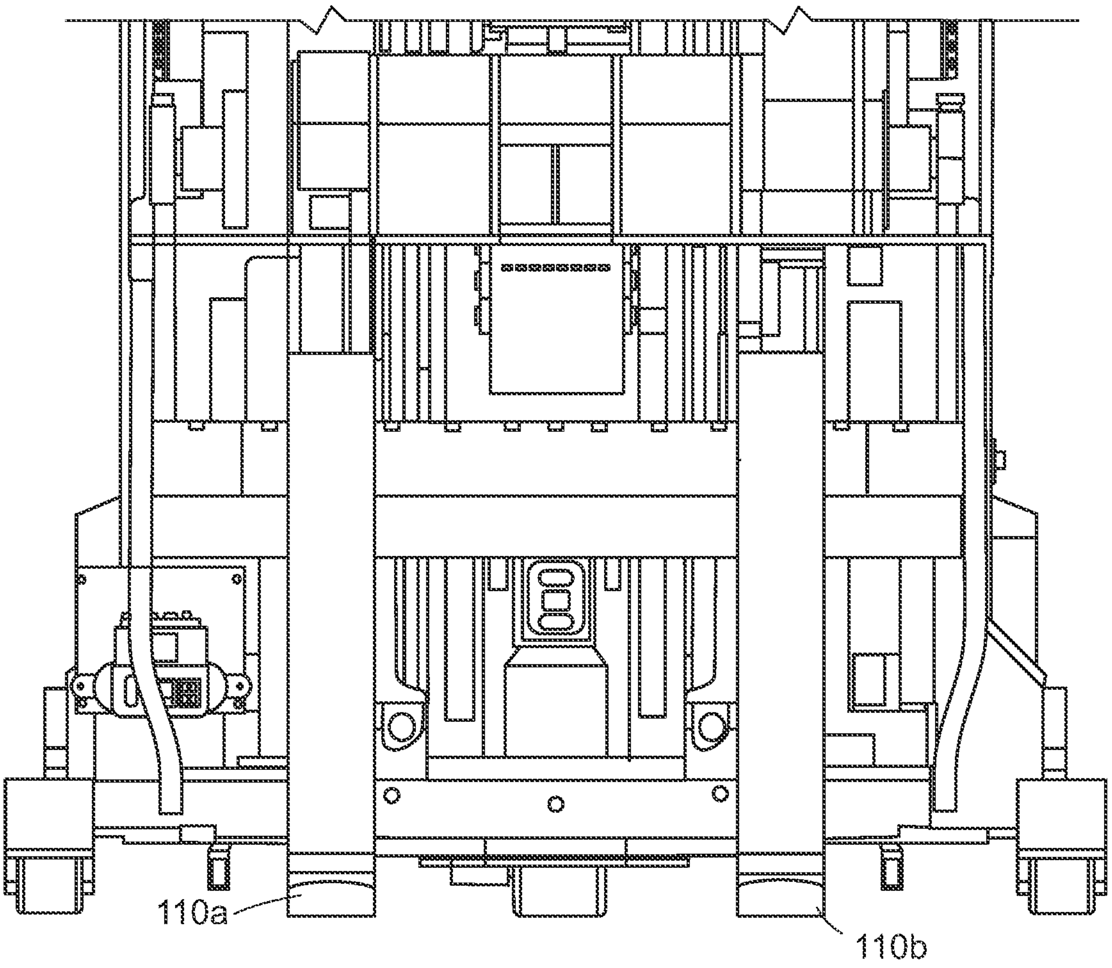
FIG. 8A is a close-up view of an embodiment of a sensor of an AMR of FIG. 5 with the forks fully lowered, in accordance with aspects of the inventive concepts.

FIG. 8A is a close-up view of an embodiment of a sensor of an AMR of FIG. 5 with the forks fully lowered, in accordance with aspects of the inventive concepts.

Figure 8B:
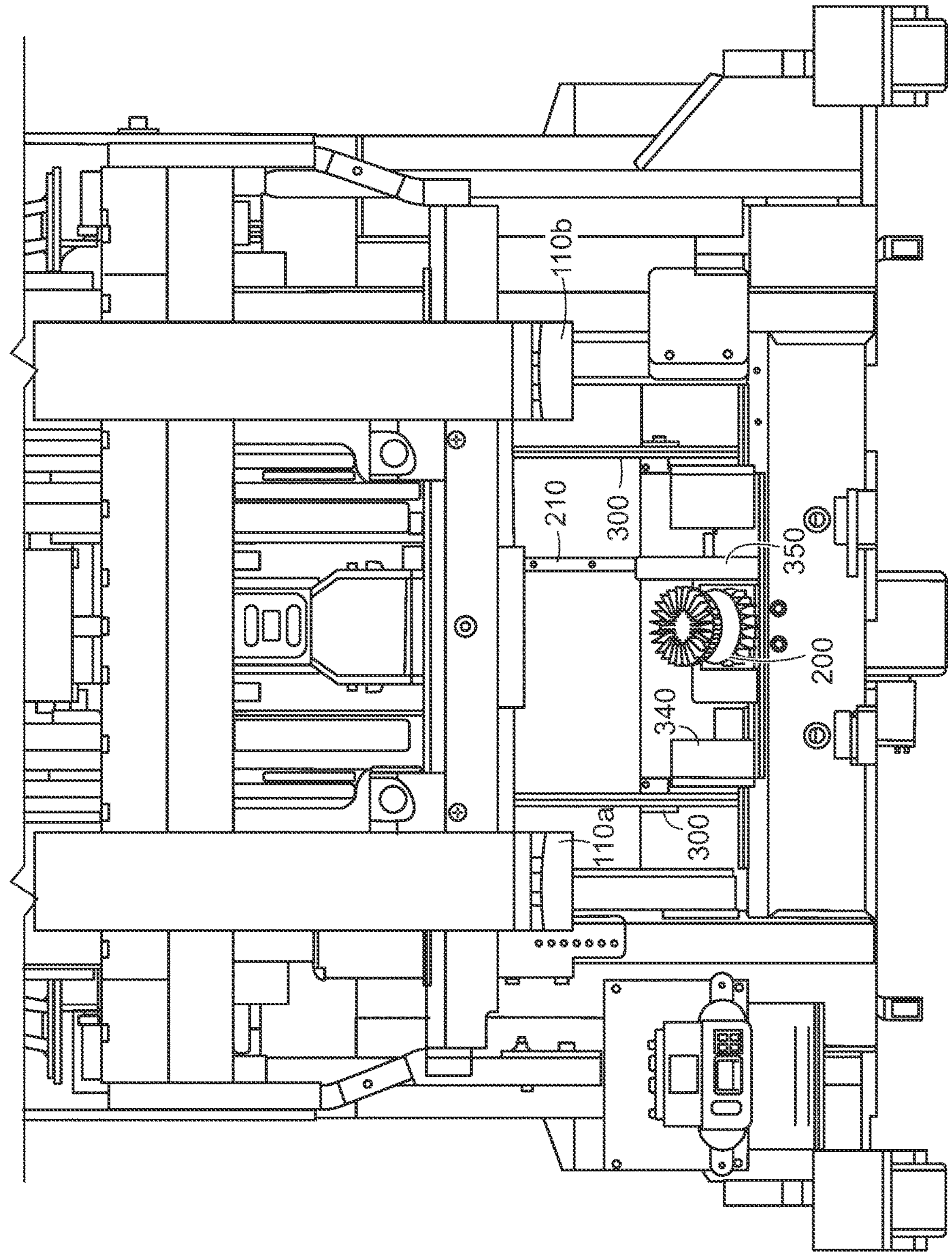
FIG. 8B is a close-up view of an embodiment of a sensor of an AMR of FIG. 5 with forks raised to payload carry height, in accordance with aspects of the inventive concepts.

FIG. 8B is a close-up view of an embodiment of a sensor of an AMR of FIG. 5 with forks raised to payload carry height, in accordance with aspects of the inventive concepts.

Figure 9A:
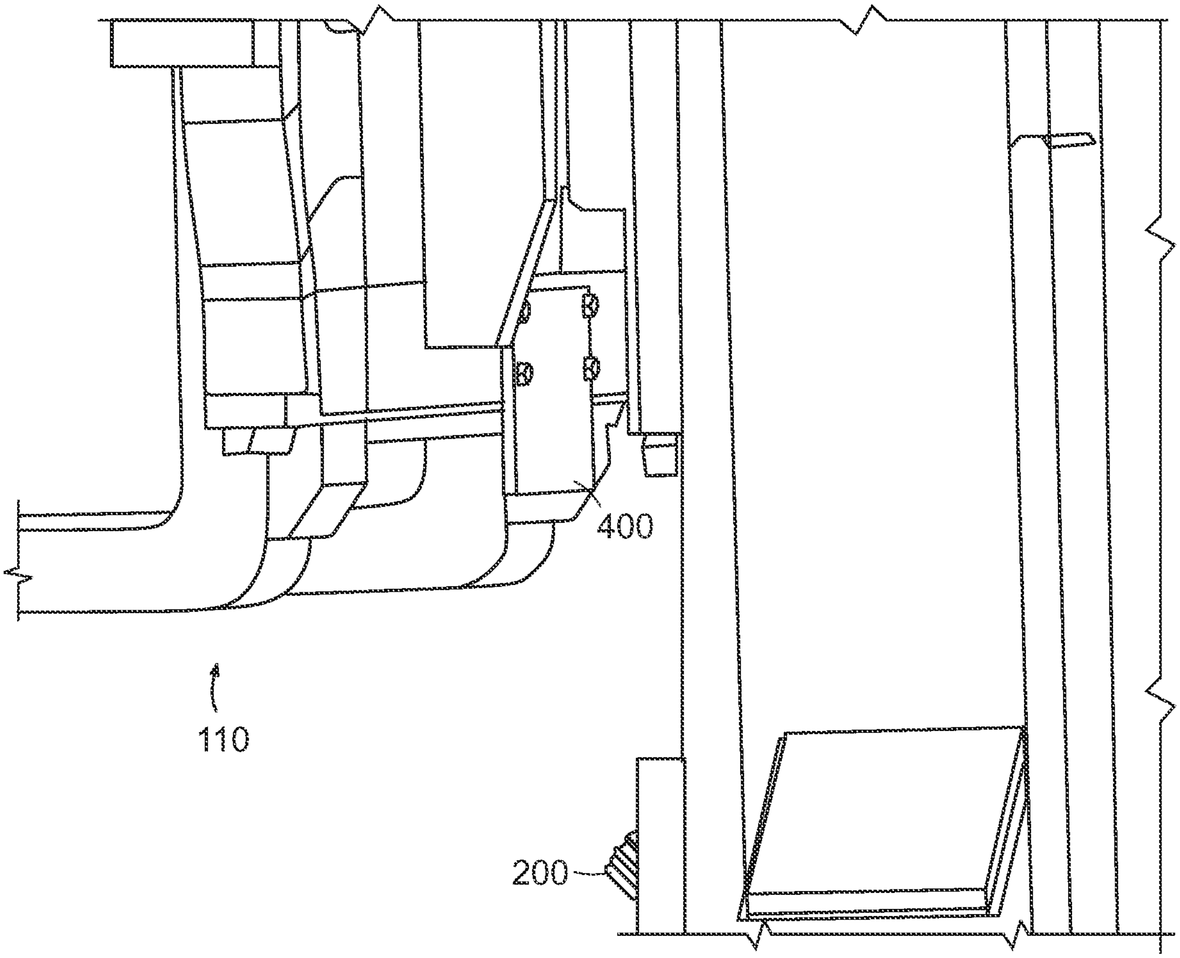
FIG. 9A is a close-up view of forks having a protection plate, in accordance with aspects of the inventive concepts.

FIG. 9A is a close-up view of forks having a protection plate 400, in accordance with aspects of the inventive concepts.

Figure 9B:
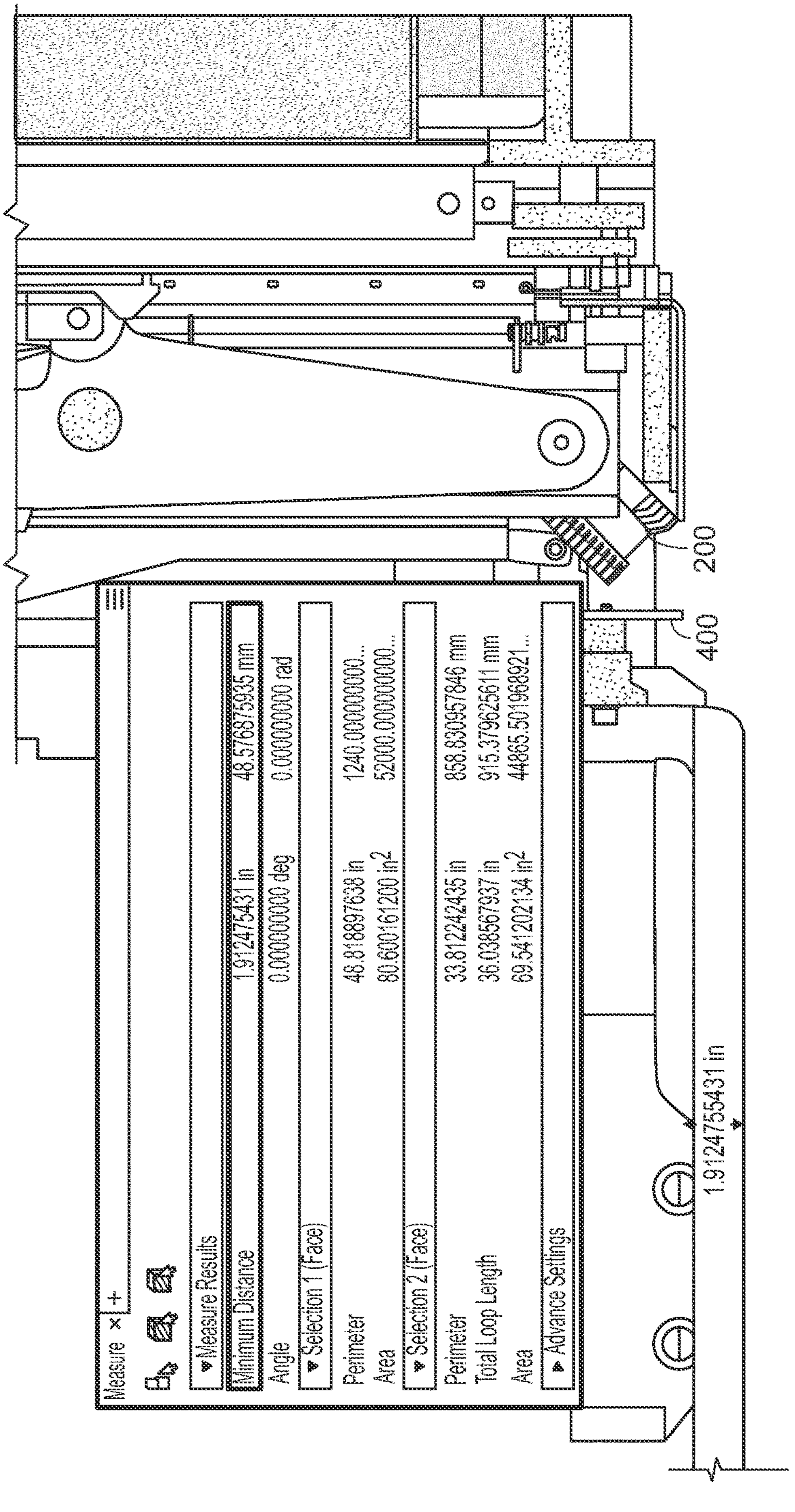
FIG. 9B is a close-up view of a sensor of an AMR protected by a protection plate of FIG. 9A, in accordance with aspects of the inventive concepts.

FIG. 9B is a close-up view of a sensor of an AMR protected by a protection plate 400 of FIG. 9A, in accordance with aspects of the inventive concepts.

In some embodiments, there is approximately 1.9 inches of clearance from the bottom of the sensor bracket 340 and the floor; however, the present inventive concepts are not limited thereto. The front of the sensor 200 is protected by the protection plate 400 at this height, as seen in FIG. 9B.

Figure 11A:
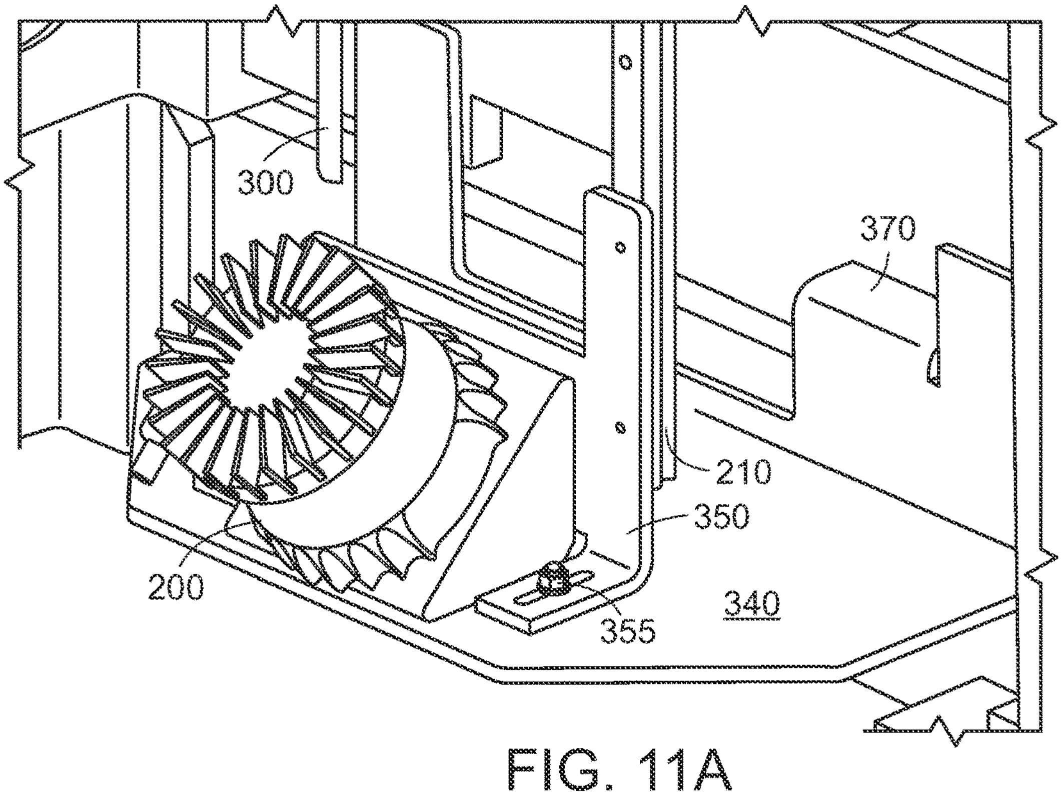
FIGS. 11A-B are close-up views of a connection of a sensor of an AMR and a slide of FIGS. 1 and 5, in accordance with aspects of the inventive concepts.
Figure 11B:
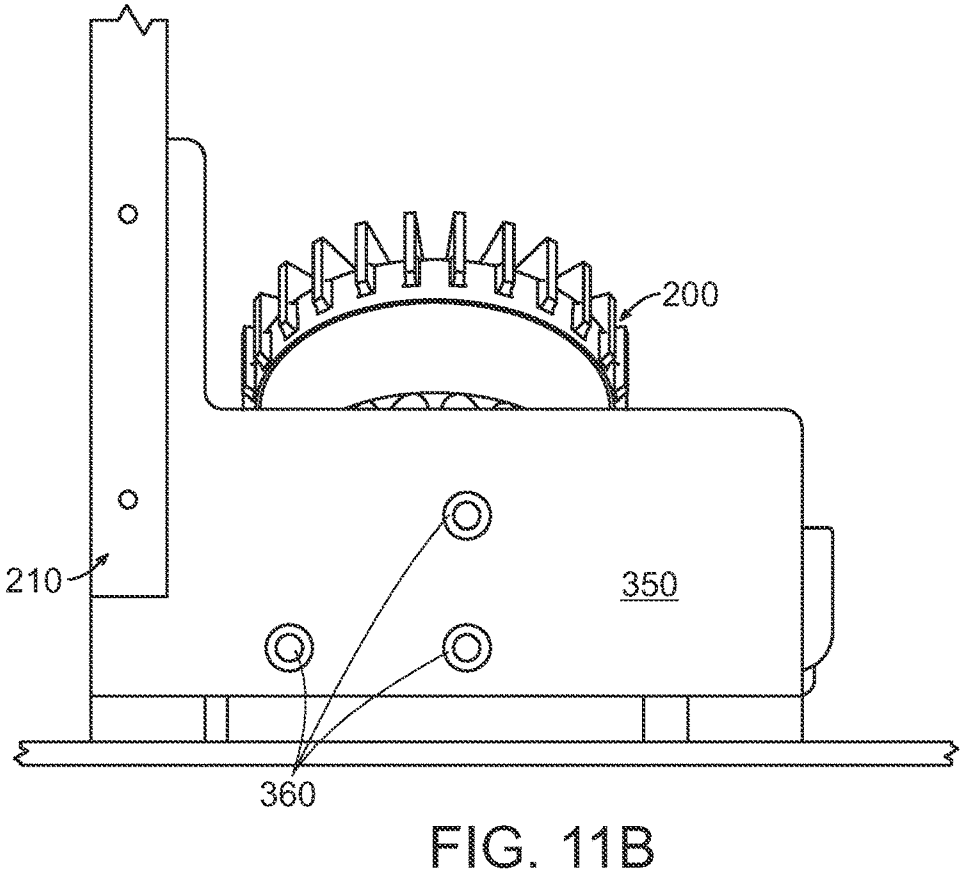

FIGS. 11A-B are close-up views of a connection of a sensor of an AMR and a slide of FIGS. 1 and 5, in accordance with aspects of the inventive concepts.

Figure 12A:
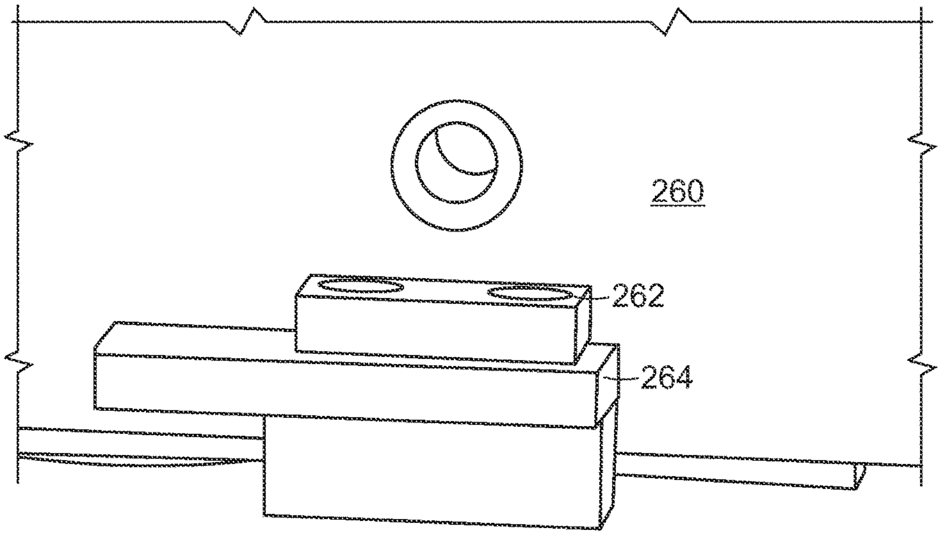
FIGS. 12A-B are close-up views of a retracting hard stop, in accordance with aspects of the inventive concepts.
Figure 12B:
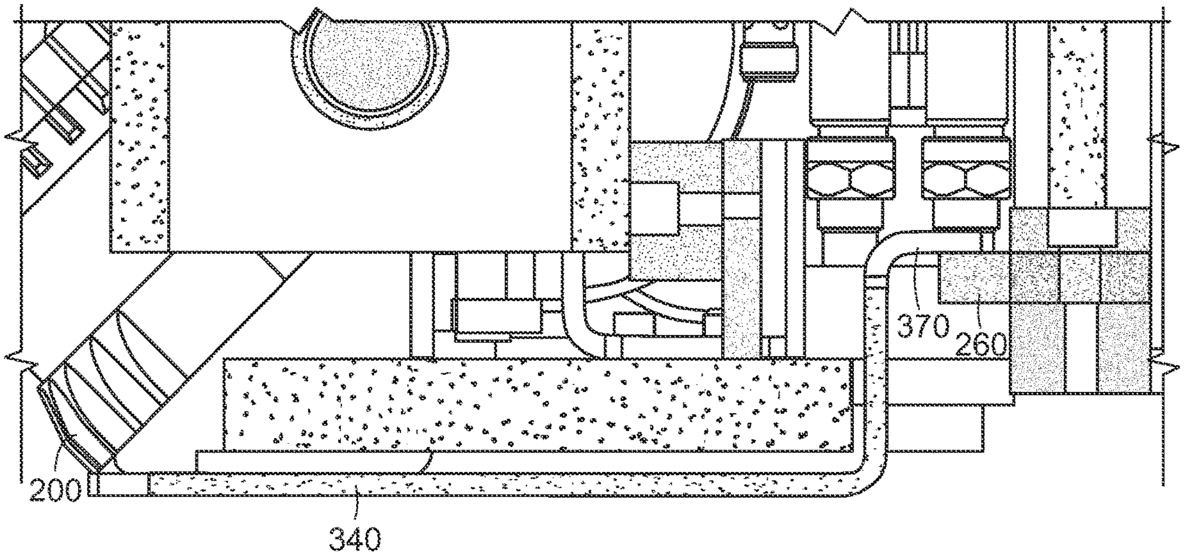

FIGS. 12A-B are close-up views of a retracting hard stop 260, in accordance with aspects of the inventive concepts. The retracting hard stop 260 includes a rubber hard stop 262 on a metal sensor hard stop 264. The flange 370 on the back of the sensor bracket 340 catches the metal sensor hard stop 264.

Figure 13:
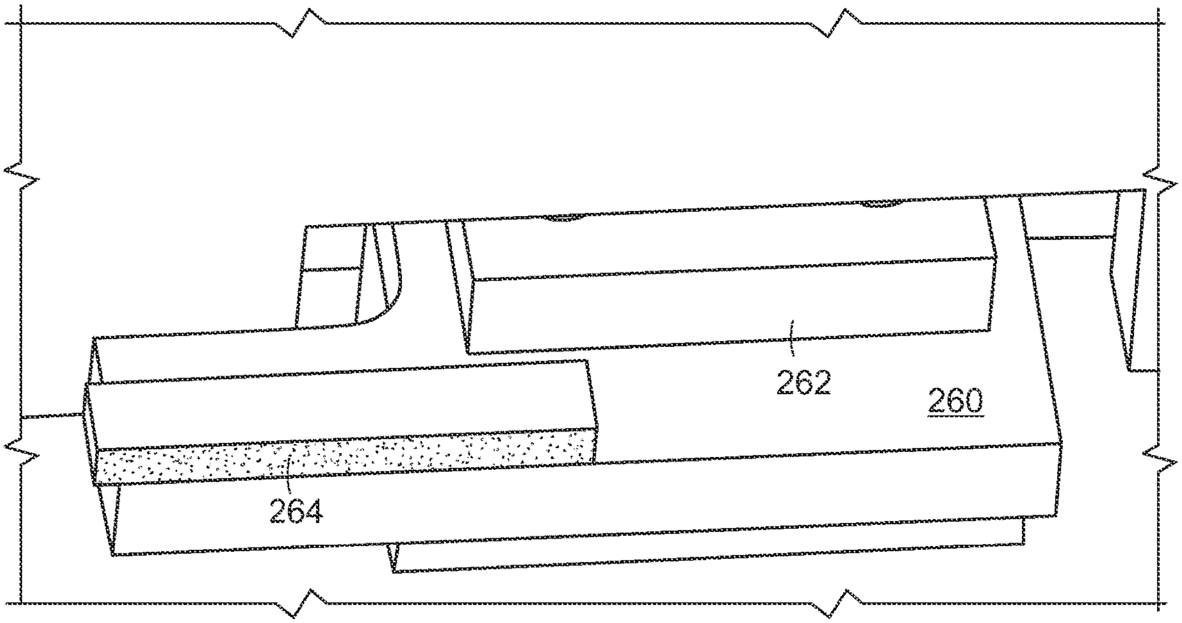
FIG. 13 is a close-up view of an alternative embodiment of a retracting hard stop, in accordance with aspects of the inventive concepts.

FIG. 13 is a close-up view of an alternative embodiment of a retracting hard stop 265, in accordance with aspects of the inventive concepts. The retracting hard stop 265 includes a portion removed to avoid interference with other elements.

Figure 14A:
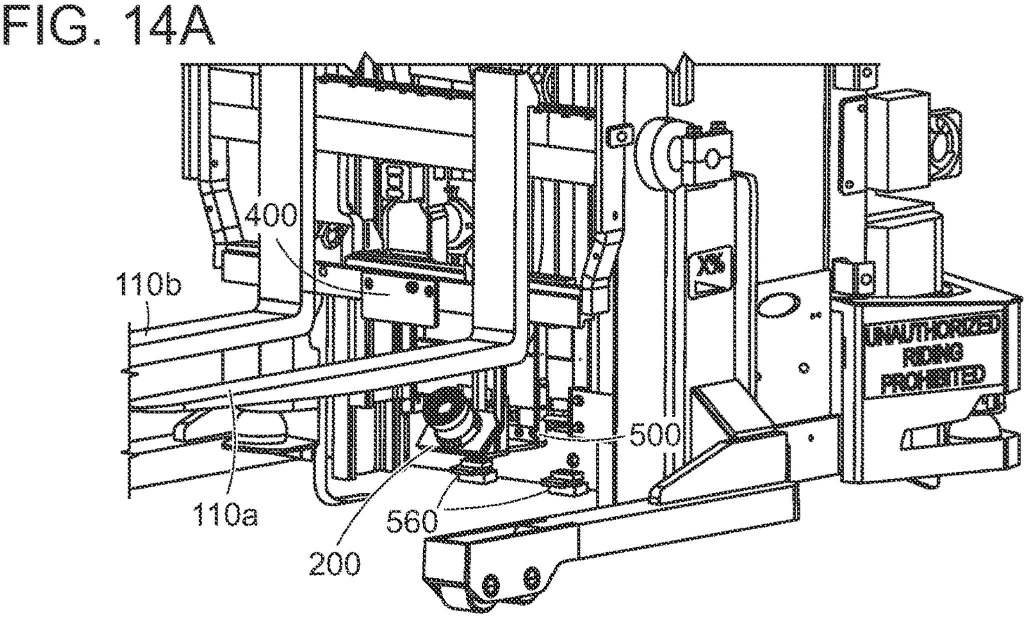
FIGS. 14A and 14B is a perspective view of an alternative embodiment of a sensor of an AMR, in accordance with aspects of the inventive concepts.
Figure 14B:
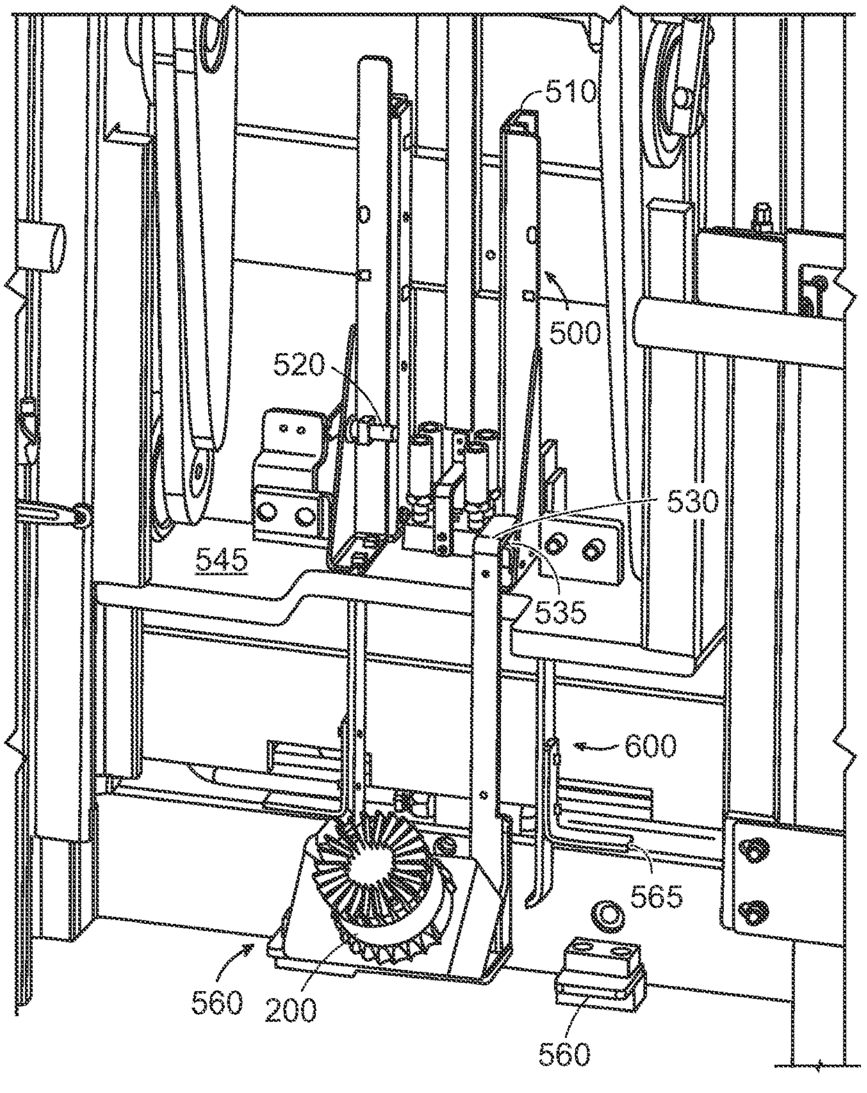
Figure 14D:
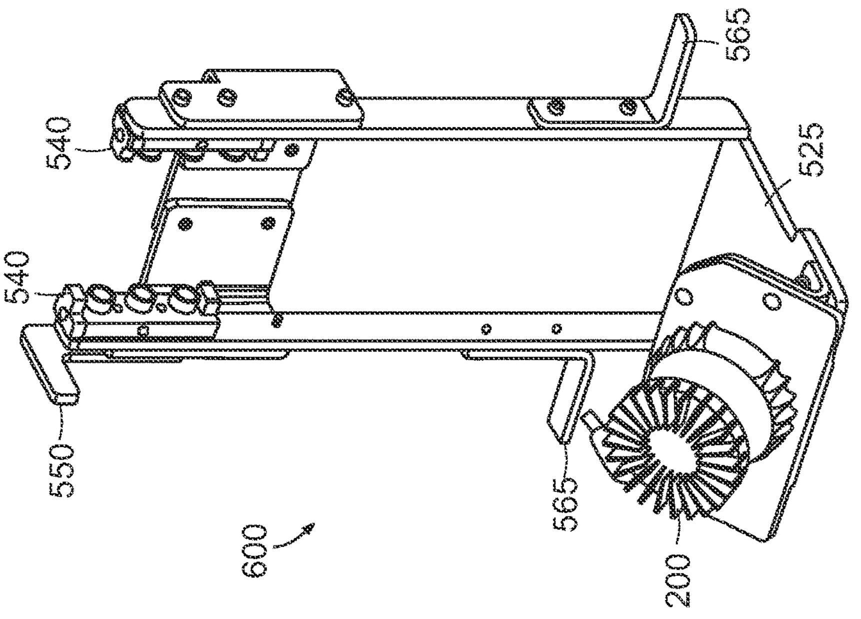
FIG. 14D is a perspective view of a roller assembly of the embodiment of FIGS. 14A and 14B, in accordance with aspects of the inventive concepts.
Figure 14C:
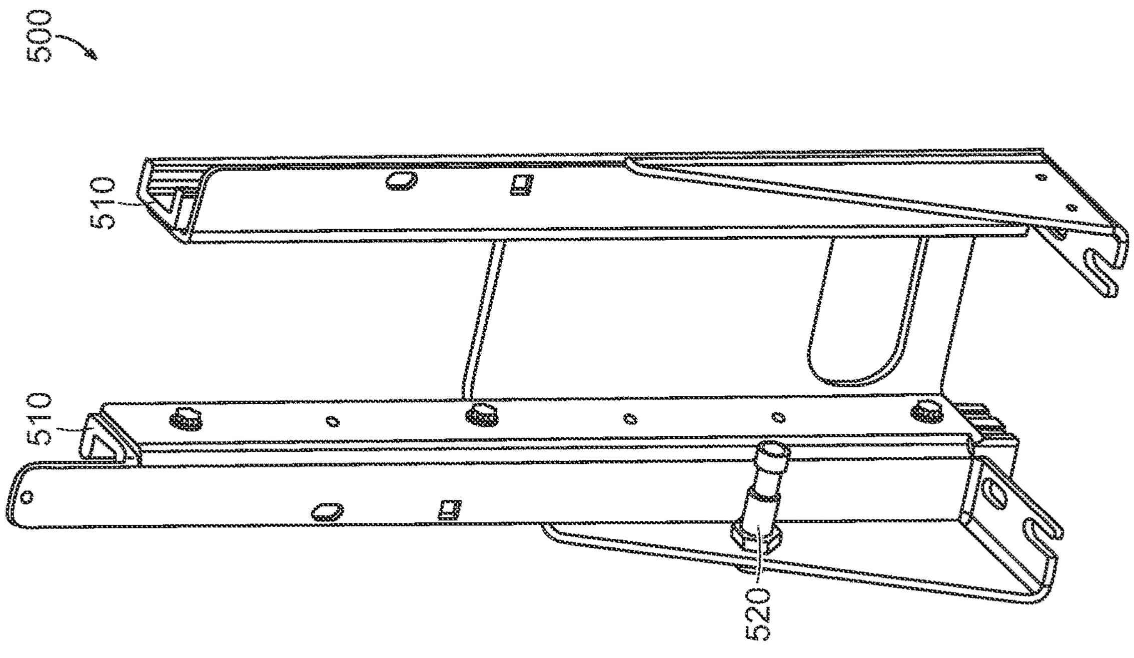
FIG. 14C is a perspective view of a rail assembly of the embodiment of FIGS. 14A and 14B, in accordance with aspects of the inventive concepts.
Figure 14E:
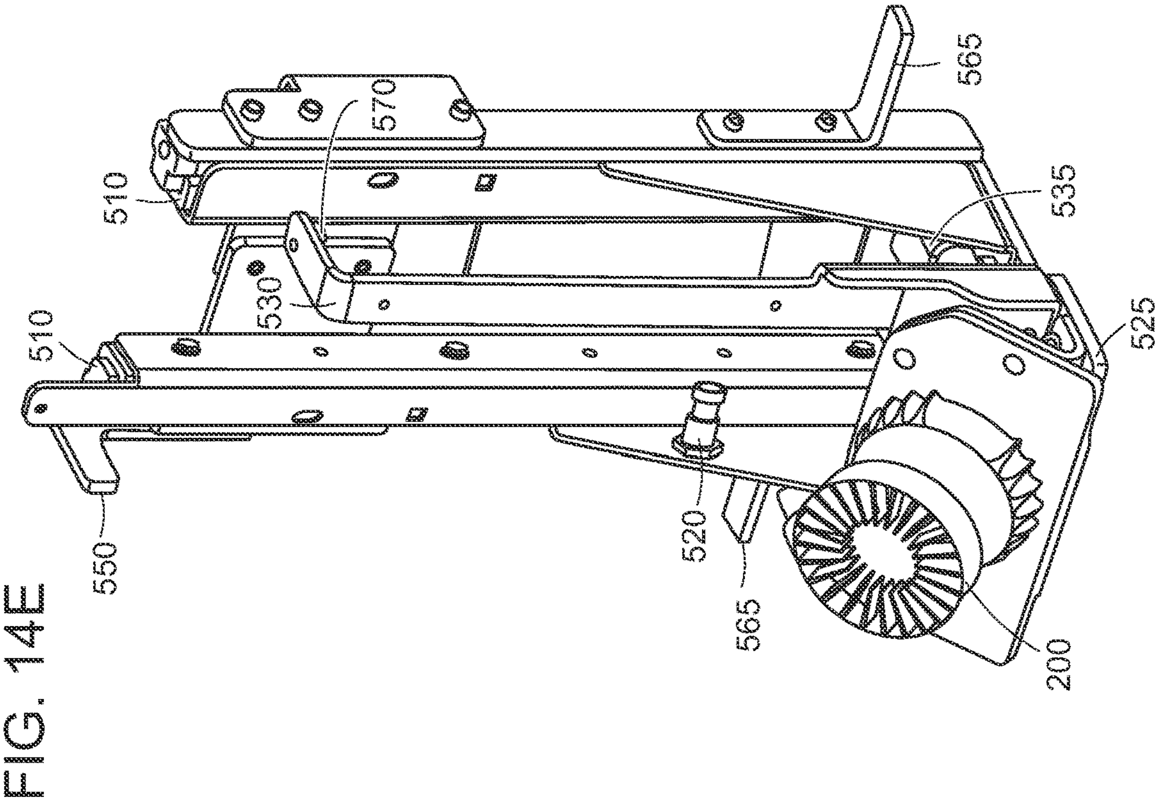
FIG. 14E is a perspective view of the rail assembly of FIG. 14C and the roller assembly of FIG. 14B in a collapsed position, in accordance with aspects of the inventive concepts.
Figure 14F:
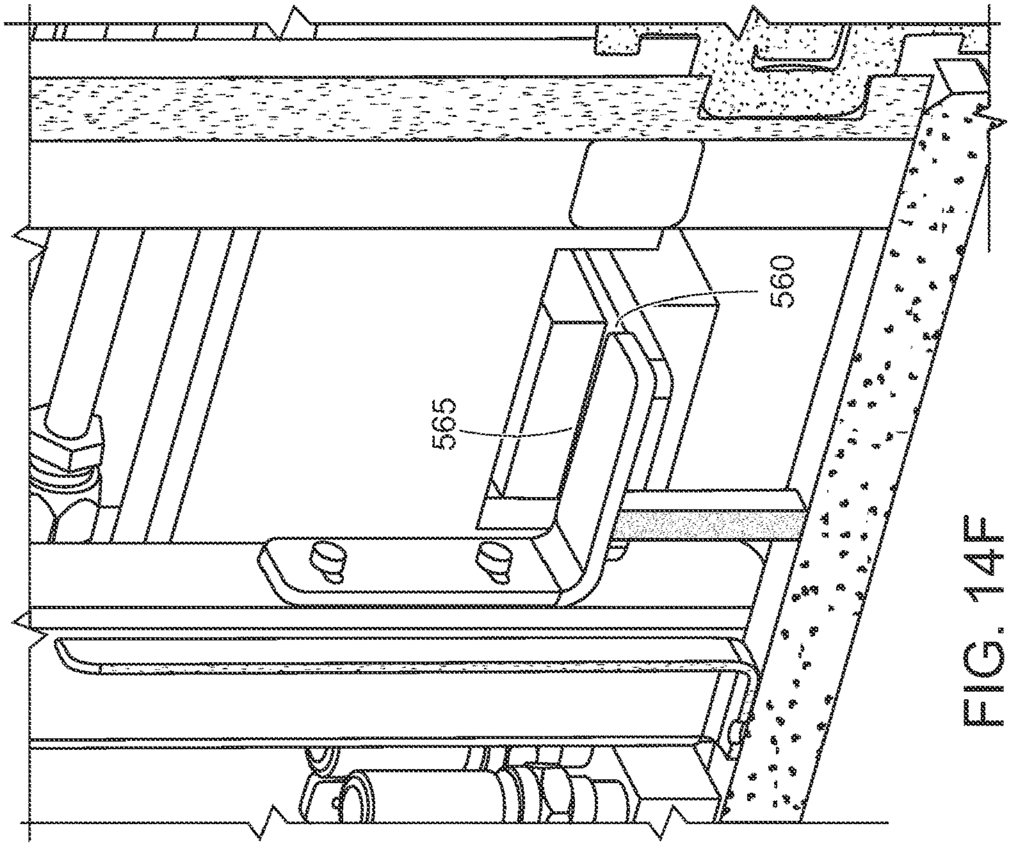
FIG. 14F is a close-up view of a retracting hard stop flag of the roller assembly of FIG. 14D engaged with a retracting hard stop, in accordance with aspects of the inventive concepts.
Figure 14H:
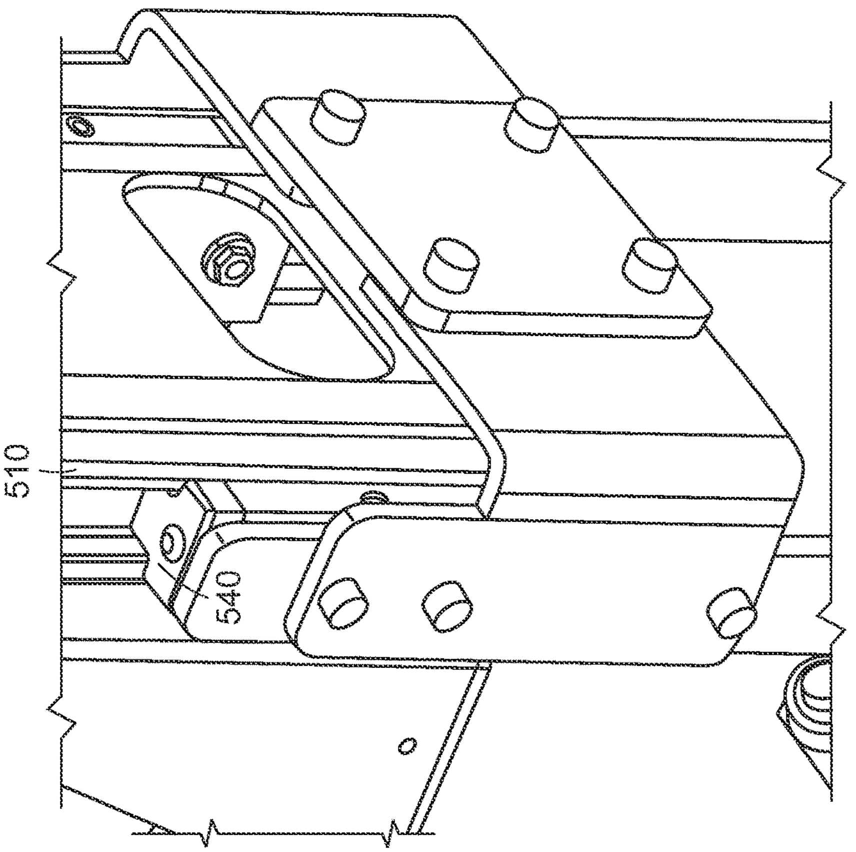
FIG. 14H is a close-up view of a roller of the roller assembly of FIG. 14D and a rail of the rail assembly of FIG. 14C, in accordance with aspects of the inventive concepts.
Figure 14G:
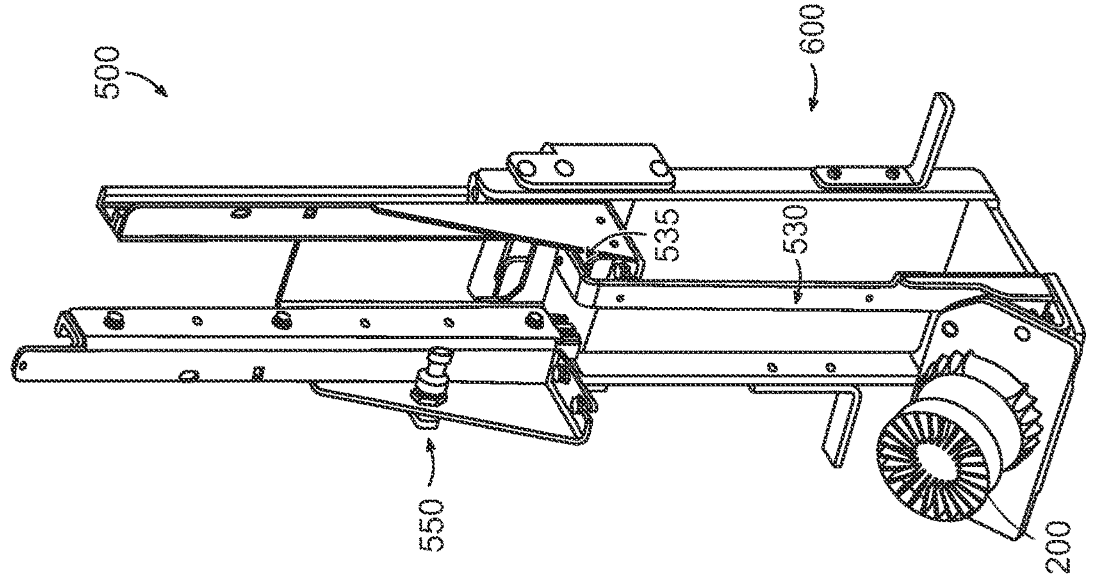
FIG. 14G is a perspective view of the rail assembly of FIG. 14C and the roller assembly of FIG. 14B in a deployed position, in accordance with aspects of the inventive concepts.
Figure 14I:
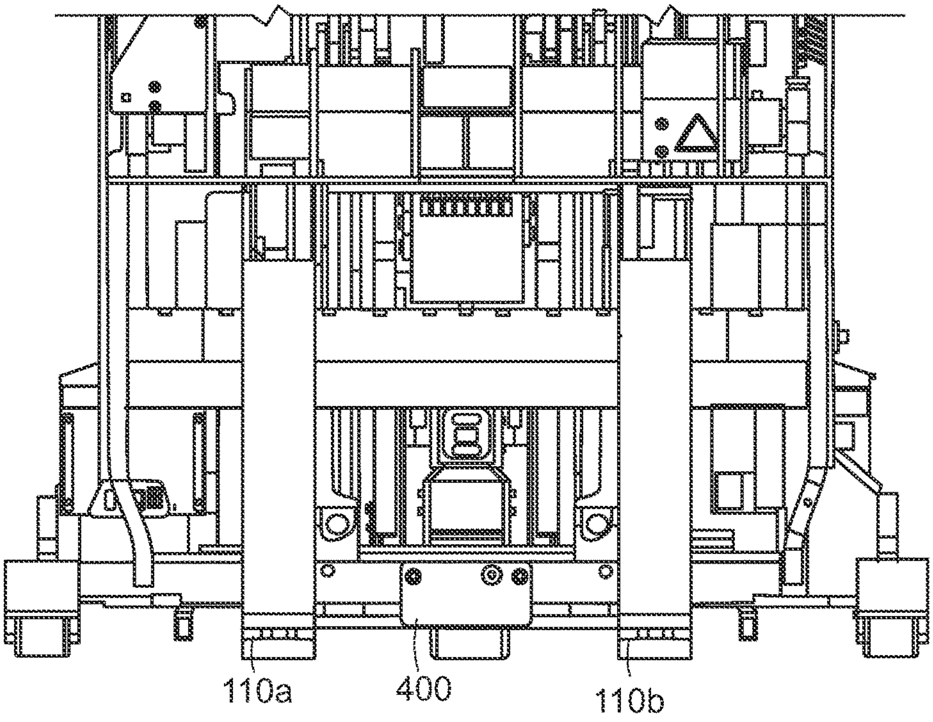
FIG. 14I is a front view of the embodiment of FIGS. 14A and 14B with the forks fully lowered, in accordance with aspects of the inventive concepts.
Figure 14J:
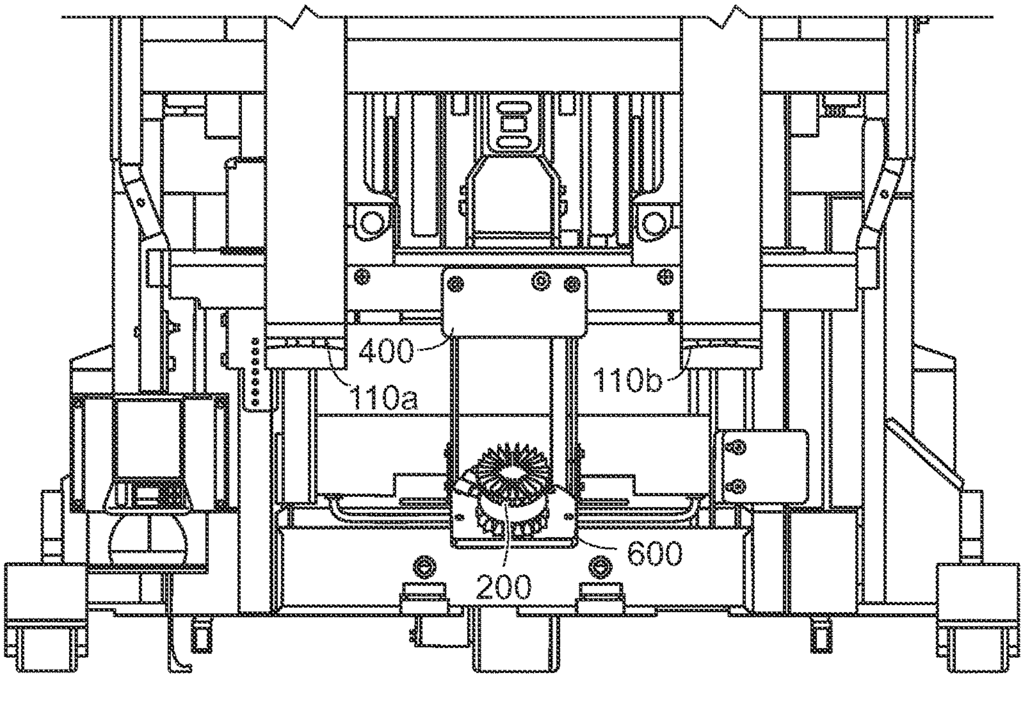
FIG. 14J is a front view of the embodiment of FIGS. 14A and 14B with forks raised to payload carry height, in accordance with aspects of the inventive concepts.

FIGS. 14A-14J contains another embodiment of an AMR having a passively actuated sensor, in accordance with aspects of the inventive concepts. FIGS. 14A and 14B is a perspective view of an alternative embodiment of a sensor of an AMR, in accordance with aspects of the inventive concepts. FIG. 14C is a perspective view of a rail assembly of the embodiment of FIGS. 14A and 14B, in accordance with aspects of the inventive concepts. FIG. 14D is a perspective view of a roller assembly of the embodiment of FIGS. 14A and 14B, in accordance with aspects of the inventive concepts. FIG. 14E is a perspective view of the rail assembly of FIG. 14C and the roller assembly of FIG. 14B in a collapsed position, in accordance with aspects of the inventive concepts. FIG. 14F is a close-up view of a retracting hard stop flag of the roller assembly of FIG. 14D engaged with a retracting hard stop, in accordance with aspects of the inventive concepts. FIG. 14G is a perspective view of the rail assembly of FIG. 14C and the roller assembly of FIG. 14B in a deployed position, in accordance with aspects of the inventive concepts. FIG. 14H is a close-up view of a roller of the roller assembly of FIG. 14D and a rail of the rail assembly of FIG. 14C, in accordance with aspects of the inventive concepts. FIG. 14I is a front view of the embodiment of FIGS. 14A and 14B with the forks fully lowered, in accordance with aspects of the inventive concepts. FIG. 14J is a front view of the embodiment of FIGS. 14A and 14B with forks raised to payload carry height, in accordance with aspects of the inventive concepts.

As seen in FIG. 14B, a rail assembly 500 is coupled to a chassis 545 of a forklift of the AMR by, for example, bolts. The sensor 200 is mounted on a sensor mount 525 of a roller assembly 600. The roller assembly 600 slides up and down within the rail 510 of the rail assembly 500.

As seen in FIG. 14C, the rail assembly 500 include rails 510 and a position sensor 520.

As seen in FIG. 14D, the roller assembly 600 includes rollers 540. The rollers 540 move up and down within the rails 510 of the rail assembly 500.

The roller assembly 600 further includes a position sensor flag 550 and retracting hard stop flags 565. As seen in FIGS. 14B, 14E and 14G, the rail assembly 500 includes a deployment hard stop 535. As seen in FIG. 14E, a deployment hard stop flag 530 is coupled to sensor mount 525 of the roller assembly 600 by, for example, bolts. The deployment hard stop flag 530 includes a magnet 570.

The position sensor 520 of the rail assembly 500 senses the position sensor flag 550 to verify a fully deployed position, as seen in FIG. 14G. The magnet 570 provides stability by preventing the sensor 200 from bouncing up and down during operation. Deployment hard stop 535 and deployment hard stop flag 530 stop the roller assembly 600 in the deployed position. The length of the deployment hard stop flag 530, determines the deployed position of the sensor 200.

In a fully deployed position, as seen in FIG. 14G, the deployment hard stop flag 530 and magnet 570 are in contact with the deployment hard stop 535.

The position sensor 520 confirms that the sensor 200 is fully deployed at a repeatable location relative to the forks 110*a,b*. The sensor 200 will move upward and downward with the forks 110*a,b* as long as the retracting hard stop flags 565 do not make contact with the retracting hard stops 560, as seen in FIGS. 14E and 14F. The sensor 200 is deployed far enough below the forks 110*a,b* that it is not obstructed by truck 100, forks 110*a,b* or payload 106 and provides an unobstructed view under, behind and below the raised forks 110*a,b*.

To retract the sensor 200, the forks 110*a,b* are lowered until the retracting hard stop flags 565 make contact with the retracting hard stops 560. At which time, the magnet 570 is released and the sensor 200 slides into its protected position as the forks 110*a,b* continue to lower to the ground, as seen in FIG. 14E.

The forks 110*a,b* can be lowered to the ground while the sensor 200 remains stationary inside the mast. The front of the sensor 200 is protected by the protection plate 400 at this height.

While the inventive concepts have been described as deploying a sensor in a vertical linear motion, the concepts can be deployed in other manners. For example, the sensor can be deployed using rotational or linear motion, or a combination thereof.

While the inventive concepts have been described within the context of robotic vehicles and AMR fork lifts, the concepts can be deployed in other systems and contexts. That is, in its simplest form, the inventive concepts include passively deploying a sensor to see under an object when that object is raised, then retracting the sensor to a protected position, when the object is lowered towards or to the ground. This could include anything that is raised and lowered (forks, platforms, elevators, etc.). As examples, in some embodiments the inventive concepts can be implemented with cranes, elevators, man-lifts, etc.).

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A passively actuated sensor kit for use with a robotic vehicle having a pair of forks coupled to a carriage that is height adjustable within a mast, the kit comprising:

an object sensor configured to couple to the carriage and passively move between a first position above the forks when the forks are lowered and a second position below the forks when the forks are raised, wherein the object sensor is configured to detect objects under the forks when the forks are raised;

a deployment hard stop defining an upper limit of movement of the carriage relative to the mast and a retracting hard stop defining a lower limit of movement of the carriage relative to the mast; and a position feedback sensor configured to determine when the carriage is at an upper limit of movement when the position feedback sensor engages the deployment hard stop, wherein the object sensor is deployed when the position feedback sensor determines that the carriage is at its upper limit of movement.

2. The kit of claim 1, further comprising a slide, wherein the object sensor is couplable to the carriage by the slide to have a defined range of movement relative to the carriage.

3. The kit of claim 1, wherein the slide is at a top of its range of motion relative to the carriage when the carriage is in contact with the retracting hard stop.

4. The kit of claim 2, wherein the slide is at a bottom of its range of motion relative to the carriage when the carriage is in contact with the deployment hard stop.

5. The kit of claim 1, further comprising a magnet at the deployment hard stop configured to prevent or dampen movement of the object sensor during robot and/or fork operation.

6. The kit of claim 1, wherein the object sensor is or includes a LiDAR scanner and/or camera.

7. The kit of claim 1, wherein when the object sensor is in the first position, the object sensor is configured to retract into the mast.

8. The kit of claim 1, further comprising a protection plate configured to couple to the pair of forks to protect the object sensor when the pair of forks is lowered.

9. The kit of claim 1, further comprising a sensor bracket, the object sensor being positioned on the sensor bracket.

10. The kit of claim 9, wherein the sensor bracket comprises a flange configured to engage a retracting hard stop defining a lower limit of movement of the carriage relative to the mast.

11. The kit of claim 9, further comprising first and second cam roller slides extending along the height of the robot and at least one cam roller positioned in the cam roller slides, wherein the cam rollers being coupled to the sensor bracket.

12. A robotic vehicle having a pair of forks coupled to a carriage that is height adjustable within a mast and including a passively actuated sensor system, comprising:

an object sensor configured to couple to the carriage and passively move between a first position above the forks when the forks are lowered and a second position below the forks when the forks are raised, wherein the object sensor is configured to detect objects under the forks when the forks are raised;

a deployment hard stop defining an upper limit of movement of the carriage relative to the mast;

a retracting hard stop defining a lower limit of movement of the carriage relative to the mast;

a position feedback sensor configured to determine when the carriage is at its upper limit of movement when the position feedback sensor engages the deployment hard stop;

a slide coupled to the carriage having a defined range of movement relative to the carriage;

a sensor bracket coupled to the slide, wherein the object sensor is coupled to the sensor bracket; and the position feedback sensor configured to determine when the carriage is at its upper limit of movement when the position feedback sensor engages the deployment hard stop, wherein the object sensor is deployed when the position feedback sensor determines that the carriage is at its upper limit of movement.

13. The robot of claim 12, further comprising:

a sensor mount configured to couple the sensor bracket to the slide.

14. The robot of claim 12, further comprising:

first and second cam roller slides extending along the height of the robot and at least one cam roller positioned in the cam roller slides, wherein the cam rollers being coupled to the sensor bracket.

15. A robotic vehicle, comprising:

a movable payload engagement apparatus;

an object sensor coupled to the movable payload engagement apparatus and passively movable between a first position above the movable payload engagement apparatus when the movable payload engagement apparatus is lowered and a second position below the movable payload engagement apparatus when the movable payload engagement apparatus is raised, wherein the object sensor is configured to detect objects under the movable payload engagement apparatus when the movable payload engagement apparatus is raised;

a deployment hard stop defining an upper limit of movement of the movable payload engagement apparatus and a retracting hard stop defining a lower limit of movement of the movable payload engagement apparatus; and a position feedback sensor configured to determine when the movable payload engagement apparatus is at its upper limit of movement when the position feedback sensor engages the deployment hard stop, wherein the object sensor is deployed when the position feedback sensor determines that the movable payload engagement apparatus is at its upper limit of movement.

16. The robot of claim 15, wherein the position feedback sensor is configured to determine when the movable payload engagement apparatus is at its lower limit of movement when the position feedback sensor engages the retracting hard stop, wherein the object sensor is retracted when the position feedback sensor determines that the movable payload engagement apparatus is at its lower limit of movement.

17. The robot of claim 15, wherein the object sensor is or include a LiDAR scanner and/or camera.

18. The kit of claim 3, wherein the slide is at a bottom of its range of motion relative to the carriage when the carriage is in contact with the deployment hard stop.

* * * * *